US012386784B2

(12) United States Patent
Yadav et al.

(10) Patent No.: US 12,386,784 B2
(45) Date of Patent: Aug. 12, 2025

(54) INTELLIGENT FILE SYSTEM SCAN

(71) Applicant: Seclore Technology Private Limited, Mumbai (IN)

(72) Inventors: Darashan Singh Yadav, Bikaner (IN); Mohd Hamza, Moradabad (IN)

(73) Assignee: SECLORE TECHNOLOGY PRIVATE LIMITED, Mumbai (IN)

( * ) Notice: Subject to any disclaimer, the term of this patent is extended or adjusted under 35 U.S.C. 154(b) by 10 days.

(21) Appl. No.: 18/468,154

(22) Filed: Sep. 15, 2023

(65) Prior Publication Data

US 2025/0094388 A1    Mar. 20, 2025

(51) Int. Cl.
*G06F 16/17* (2019.01)
*G06F 16/14* (2019.01)
*G06F 16/16* (2019.01)
*G06F 16/18* (2019.01)

(52) U.S. Cl.
CPC .......... *G06F 16/1734* (2019.01); *G06F 16/14* (2019.01); *G06F 16/164* (2019.01); *G06F 16/1815* (2019.01)

(58) Field of Classification Search
CPC .... G06F 16/1734; G06F 16/164; G06F 16/14; G06F 16/1815
See application file for complete search history.

(56) References Cited

U.S. PATENT DOCUMENTS

| | | | |
|---|---|---|---|
| 7,890,469 B1 * | 2/2011 | Maionchi | G06F 16/10 707/654 |
| 8,397,295 B1 * | 3/2013 | Naftel | G06F 21/562 726/23 |
| 9,424,266 B2 * | 8/2016 | Perlin | G06F 21/565 |
| 10,628,263 B1 * | 4/2020 | Cowen | G06F 11/1435 |
| 2016/0321145 A1 * | 11/2016 | Fang | G06F 11/1451 |
| 2017/0132429 A1 * | 5/2017 | Bell | H04L 9/0891 |
| 2017/0177452 A1 * | 6/2017 | Parab | G06F 3/0641 |
| 2022/0368726 A1 * | 11/2022 | Balasubramaniam | H04L 63/1441 |

* cited by examiner

*Primary Examiner* — Huawen A Peng
(74) *Attorney, Agent, or Firm* — Pillsbury Winthrop Shaw Pittman LLP

(57) ABSTRACT

A system may parse, during a current filesystem check, a sparse file stream comprising a plurality of Update Sequence Numbers (USNs). A system may access a checkpoint USN that is locally stored apart from the sparse file stream and serves as a checkpoint of a prior USN that was accessed during a prior filesystem check. A system may identify a next byte offset for a next USN of a file in the sparse file stream after the checkpoint USN based on the byte offset of the checkpoint USN. A system may update the checkpoint USN with the next USN. A system may identify a file event from the sparse file stream based on the next USN without polling files or directories on the filesystem. A system may pass the file event to a downstream system.

21 Claims, 15 Drawing Sheets

| | Offset | 00 01 02 03 04 05 06 07 | 08 09 10 11 12 13 14 15 | ASCII |
|---|---|---|---|---|
| | 00000000000 | 00 00 00 00 00 00 00 00 | 00 00 00 00 00 00 00 00 | .............. |
| | 00000000016 | 00 00 00 00 00 00 00 00 | 00 00 00 00 00 00 00 00 | .............. |
| | 00000000032 | 00 00 00 00 00 00 00 00 | 00 00 00 00 00 00 00 00 | .............. |
| | 00000000048 | 00 00 00 00 00 00 00 00 | 00 00 00 00 00 00 00 00 | .............. |
| | 00000000064 | 00 00 00 00 00 00 00 00 | 00 00 00 00 00 00 00 00 | .............. |
| | 00000000080 | 00 00 00 00 00 00 00 00 | 00 00 00 00 00 00 00 00 | .............. |
| | 00000000096 | 00 00 00 00 00 00 00 00 | 00 00 00 00 00 00 00 00 | .............. |
| | 00000000112 | 00 00 00 00 00 00 00 00 | 00 00 00 00 00 00 00 00 | .............. |
| | 00000000128 | 00 00 00 00 00 00 00 00 | 00 00 00 00 00 00 00 00 | .............. |
| | 00000000144 | 00 00 00 00 00 00 00 00 | 00 00 00 00 00 00 00 00 | .............. |
| | 00000000160 | 00 00 00 00 00 00 00 00 | 00 00 00 00 00 00 00 00 | .............. |
| | 00000000176 | 00 00 00 00 00 00 00 00 | 00 00 00 00 00 00 00 00 | .............. |
| | 00000000192 | 00 00 00 00 00 00 00 00 | 00 00 00 00 00 00 00 00 | .............. |
| | 00000000208 | 00 00 00 00 00 00 00 00 | 00 00 00 00 00 00 00 00 | .............. |
| | 00000000224 | 00 00 00 00 00 00 00 00 | 00 00 00 00 00 00 00 00 | .............. |
| | 00000000240 | 00 00 00 00 00 00 00 00 | 00 00 00 00 00 00 00 00 | .............. |
| | 00000000256 | 00 00 00 00 00 00 00 00 | 00 00 00 00 00 00 00 00 | .............. |
| | 00000000272 | 00 00 00 00 00 00 00 00 | 00 00 00 00 00 00 00 00 | .............. |
| | 00000000288 | 00 00 00 00 00 00 00 00 | 00 00 00 00 00 00 00 00 | .............. |
| | 00000000304 | 00 00 00 00 00 00 00 00 | 00 00 00 00 00 00 00 00 | .............. |
| | 00000000320 | 00 00 00 00 00 00 00 00 | 00 00 00 00 00 00 00 00 | .............. |
| | 00000000336 | 00 00 00 00 00 00 00 00 | 00 00 00 00 00 00 00 00 | .............. |
| | ... | | | |
| | 32818585520 | 00 00 00 00 00 00 00 00 | 00 00 00 00 00 00 00 00 | .............. |
| First non-zero 4-byte integer | 32818585536 | 00 00 00 00 00 00 00 00 | 00 00 00 00 00 00 00 00 | .............. |
| | 32818585552 | 00 00 00 00 00 00 00 00 | 00 00 00 00 00 00 00 00 | .............. |
| | 32818585568 | 00 00 00 00 00 00 00 00 | 00 00 00 00 00 00 00 00 | .............. |
| → | 32818585584 | 00 00 00 00 00 00 00 00 | 00 00 00 00 00 00 00 00 | .............. |
| | 32818585600 | 60 00 00 00 02 00 00 00 | 74 FA 04 00 00 00 3C 00 | `.......t.....<. |
| | 32818585616 | A4 78 02 00 00 00 01 00 | 00 E0 23 A4 07 00 00 00 | ¤x........#¤.... |
| | 32818585632 | 4C CE A0 04 6F 65 D9 01 | 00 02 00 80 00 00 00 00 | LÎ..oeÙ......... |
| | 32818585648 | 00 00 00 00 20 00 00 00 | 24 00 3C 00 38 00 32 00 | .... ...$.<.8.2. |
| | 32818585664 | 62 00 37 00 31 00 39 00 | 34 00 61 00 34 00 39 00 | b.7.1.9.4.a.4.9. |
| | 32818585680 | 37 00 31 00 64 00 39 00 | 39 00 63 00 5F 00 30 00 | 7.1.d.9.9.c._.0. |
| | 32818585696 | 60 00 00 00 02 00 00 00 | 7A FA 04 00 00 00 0E 00 | `.......z....... |
| | 32818585712 | A4 78 02 00 00 00 01 00 | 60 E0 23 A4 07 00 00 00 | ¤x......`.#¤.... |
| | 32818585728 | 4C CE A0 04 6F 65 D9 01 | 00 02 00 80 00 00 00 00 | LÎ..oeÙ......... |
| | 32818585744 | 00 00 00 00 20 00 00 00 | 24 00 3C 00 63 00 61 00 | .... ...$.<.c.a. |
| | 32818585760 | 35 00 37 00 63 00 64 00 | 65 00 31 00 37 00 32 00 | 5.7.c.d.e.1.7.2. |
| | 32818585776 | 66 00 35 00 30 00 36 00 | 62 00 61 00 5F 00 30 00 | f.5.0.6.b.a._.0. |
| | 32818585792 | 60 00 00 00 02 00 00 00 | 65 FA 04 00 00 00 9F 00 | `.......e....... |
| | 32818585808 | A4 78 02 00 00 00 01 00 | C0 E0 23 A4 07 00 00 00 | ¤x......À.#¤.... |
| | 32818585824 | 58 F5 A0 04 6F 65 D9 01 | 00 02 00 80 00 00 00 00 | Xõ..oeÙ......... |

| Offset | 00 01 02 03 04 05 06 07 | 08 09 10 11 12 13 14 15 | ASCII | Unicode |
|---|---|---|---|---|
| 286226544 | 00 00 00 00 00 00 00 00 | 68 00 00 00 00 02 00 00 | x.t..h.. | xt..h.. |
| 286226560 | 78 00 74 00 00 00 00 00 | C4 3E 00 00 00 00 00 00 | ......Ä> | ...% |
| 286226576 | CC C8 03 00 00 00 02 00 | A7 6F BF 61 56 66 D9 01 | .....§o¿aVfÙ. | ..§.O |
| 286226592 | 78 78 0F 11 00 00 00 00 | 00 00 00 00 20 00 00 00 | xx...... | .... |
| 286226608 | 00 01 00 00 00 00 00 00 | 77 00 20 00 54 00 65 00 | ......w. .T.e. | ..&New.te |
| 286226624 | 2A 00 3C 00 4E 00 65 00 | 6F 00 63 00 75 00 6D 00 | *.<.N.e.o.c.u.m. | *.<New.te |
| 286226640 | 78 00 74 00 20 00 44 00 | 74 00 78 00 74 00 00 00 | x.t. .D.t.x.t... | xt.Docum ent.txt.. |
| 286226656 | 65 00 6E 00 74 00 2E 00 | CC C8 03 00 00 00 02 00 | e.n.t... | h....... |
| 286226656 | 68 00 00 00 02 00 00 00 | | h..... | |

Start of Parsed Record

*FIG. 4*

| Name | Offset | Value |
|---|---|---|
| Signature (must be 'FILE') | 000 | FILE |
| Offset to the update sequence | 004 | 0X30 |
| Update sequence size in words | 006 | 3 |
| LSN | 008 | 1,695,859,544 |
| Sequence number | 016 | 2 |
| Hard link count | 018 | 1 |
| Offset to the first attribute | 020 | 0X38 |
| Flags | 022 | 00 00 |
| Real size of the FILE record | 024 | 352 |
| Allocated size of the FILE record | 028 | 1,024 |
| Base FILE record | 032 | 0 |
| Next attribute ID | 040 | 5 |
| ID of this record | 044 | 273,900 |
| USN | 048 | 0B 00 |
| Update sequence array | 050 | 00 00 00 00 |
| Attribute $10 | 056 | |
| Attribute $30 | 152 | |
|   Attribute type | 152 | 0X30 |
|   Length (including header) | 156 | 120 |
|   Non-resident flag | 160 | 0 |
|   Name length | 161 | 0 |
|   Name offset | 162 | 0X00 |
|   Flags | 164 | 00 00 |

```
View ▼    ASCII   Unicode

Offset       00 01 02 03 04 05 06 07  08 09 10 11 12 13 14 15
2804736000   46 49 4C 45 30 00 03 00  58 C3 14 65 00 00 00 00
2804736016   02 00 01 00 38 00 00 00  60 01 00 00 00 04 00 00
2804736032   00 00 00 00 00 00 00 00  05 00 00 00 EC 2D 04 00
2804736048   0B 00 00 00 00 00 00 00  10 00 00 00 60 00 00 00
2804736064   00 00 00 00 00 00 00 00  48 00 00 00 18 00 00 00
2804736080   F2 CC 37 68 05 C2 D8 01  00 F4 37 68 05 0C2 D8 01
2804736096   16 05 47 86 1D EE D8 01  08 E2 2B 5C 20 EE D8 01
2804736112   00 00 00 00 00 0C 01 00  00 00 00 00 00 00 00 00
2804736128   00 00 00 00 00 00 00 00  30 00 00 00 78 00 00 00
2804736144   A0 69 BB 04 00 00 00 00  5A 00 00 00 18 00 01 00
2804736160   00 00 00 00 00 00 04 00  F2 CC 37 68 05 C2 D8 01
2804736176   22 3B 04 00 00 00 00 00  00 F4 37 68 05 C2 D8 01
2804736192   00 F4 37 68 05 C2 D8 01  00 00 00 00 00 00 00 00
2804736208   32 88 00 00 00 00 00 00  20 00 00 00 00 00 00 00
2804736224   0C 00 38 00 34 00 39 00  32 00 30 00 31 00 33 00
2804736240   36 00 2E 00 77 00 65 00  6D 00 00 00 00 00 00 00
2804736256   0C 00 77 00 48 00 00 00  01 00 00 00 03 00 00 00
2804736272   40 00 00 00 00 00 00 00  80 00 00 00 90 00 00 00
2804736288   32 88 00 00 00 00 00 00  32 88 00 00 00 00 00 00
2804736304   41 09 75 99 89 04 00 00  FF FF FF FF 82 79 47 11
```

INTELLIGENT FILE SYSTEM SCAN

BACKGROUND

Various systems may scan a filesystem to identify file events. A file event refers to activity relating to a file or folder in a filesystem. Examples of file events include file creation, modification, deletion, and renaming. These systems may use the results of the file scan in various contexts. For example, an antivirus system may scan the filesystem to detect new or updated files to determine whether the files have been infected with or are virus-related files. A file backup system may scan the file system to generate backup copies of the new or updated files. A Digital Rights Management (DRM) system may scan the file system to apply digital rights protection on new or updated files. In these and other systems, a file scan can be a useful tool to secure, backup, protect, or otherwise enumerate files of the filesystem. However, file scans are computationally expensive. For example, a file scan may consume a high amount of disk Input-Output (IO), which may degrade the performance of other systems and applications operating on the computer system that conducts the scan. Furthermore, when there is a large amount of data on the filesystem, the file scans may take a large amount of time to complete. Thus, what is needed is to be able to scan a filesystem in a more efficient manner. These and other issues exist with scanning a filesystem.

SUMMARY

The disclosure relates to improved systems and methods for efficient file scans. For example, a computer system may efficiently identify file events for processing by one or more of the aforementioned systems without performing unnecessary and inefficient file scans. To further improve scan efficiency, the computer system may determine a scan frequency of some or all of a filesystem based on a density of activity. To facilitate these and other improvements, the computer system may include, among other things, a file stream scanning module, a logfile scanning module, and a velocity-based scanning module.

The file stream scanning module may detect file events of interest and identifying files to be flagged for processing by the downstream systems based on the detected file events. The file stream scanning module may detect file events based on a sparse file stream. A journaling filesystem may generate the sparse file stream to maintain a record of changes to user data, such as modifications to the contents of files. Unlike other logfiles that may be generated by the journaling filesystem, the sparse file stream is insufficient by itself to recover lost data. Nevertheless, the file stream scanning module may read the sparse file stream to identify files that are to be evaluated by anti-virus, backup, DRM, and/or other systems.

The sparse file stream may store Update Sequence Numbers (USNs) that are each unique for every record added to the sparse file stream. The USN is also the byte offset of the record that it is identifying (offset from the beginning of the sparse file stream). When new records are written to the end of the sparse file stream, records at the start of the sparse file stream are turned to null bytes, freeing up disk space is freed up as a functionality of a sparse file. A USN is used to track changes to user data. The USN may be 64-bit number that is associated with each file and directory in the file system. Each time a file or directory is modified, the USN for that object is incremented, indicating that a change has occurred.

The file stream scanning module may search for a checkpoint USN in the sparse file stream. The checkpoint USN is a USN that is locally-stored (separate from the spare file stream) and indicates the last USN that was identified by the file stream scanning module. If a match is not found, the file stream scanning module may invoke a native scanner. The native scanner may use native operating system functions to perform a file scan. Thus, a file scan may be performed by the file stream scanning module only when a checkpoint USN is not found in the sparse file stream, reducing or eliminating unnecessary file scans. Relevant file events detected by the native scanner may be passed to downstream systems and the highest USN may be locally-stored as the checkpoint USN.

If a matching checkpoint USN is found in the sparse file stream, then the file stream scanning module may identify the first USN that is higher than the checkpoint USN (hereinafter "next USN"). The file stream scanning module may parse the sparse file stream to identify the file event associated with the next USN. The beginning of the sparse file stream may include sparse data that can be skipped from processing. If the sparse file stream has been parsed at least once, the file stream scanning module may directly skip to the last USN processed by treating it as the offset (in bytes) from the beginning of the file stream. If the sparse file stream is being parsed for the first time, the file stream scanning module may skip to the first non-zero 4-byte integer. Based on the record structure of the sparse file stream, the file stream scanning module may interpret record bytes. These values may be little-endian, except for the value corresponding to the filename. The beginning of subsequent records will be aligned in multiples of 8 bytes.

Based on parsing the record structure, the file stream scanning module may extract a Reason field of a record. The Reason field may encode a file event that occurred for a corresponding file. For example, the Reason field may be encoded as a bit string, bit array, or binary numeral. The file stream scanning module may perform bitwise decoding to identify the type of event.

Once a file event has been determined from the sparse file stream, the file stream scanning module may identify a file path for the corresponding file. The file stream scanning module may identify the file path of a file from a Master File Table (MFT) based on the corresponding USN for the file. The file stream scanning module may pass detected file events and identified file paths to a downstream system, and update the checkpoint USN.

In addition to or instead of the sparse file stream, the computer system may leverage a journaling filesystem log (hereinafter, "logfile"). A journaling filesystem may generate the logfile to track changes to file system metadata, such as updates to the MFT and directory structures. The logfile records information such as unique file identifier, the type of change made to the file, and the time of the change. Unlike the sparse file stream, the logfile may be used by a filesystem driver to recover the file system in the event of a system crash.

The logfile may store Log Sequence Numbers ("LSNs"). An LSN is used by the file system to keep track of changes to the logfile. The LSN is a unique, sequential number that identifies the order in which changes are made to the filesystem metadata. Each time a change is made to the metadata, the LSN is incremented, and the change is recorded in the logfile with the new LSN value. The LSN is used to ensure that the logfile is updated in a consistent and orderly fashion, and to recover the file system in the event of a system crash.

The logfile scanning module may search for a checkpoint LSN in the logfile. The checkpoint LSN is a LSN that is locally-stored (separate from the logfile) and indicates the last LSN that was identified by the logfile scanning module. In other words, the checkpoint LSN is stored/cached by the logfile scanning module as a checkpoint to all the metadata changes in the filesystem that have already been parsed/scanned. If a match is not found, the state of the logfile scanning module may be outdated. This will also be referred to as the logfile scanning module being in an inconsistent state. For example, there may be changes to the filesystem that have not been accounted for.

To detect these changes and to bring the logfile scanning module 124 back to a consistent state, a native scanner 116 may be invoked and any detected file events may be passed to a downstream process, similar to the manner with respect to the file stream scanning module. Alternatively or additionally, to bring the logfile scanning module back to a consistent state, the logfile scanning module 124 may parse and loop through the logfile from the smallest LSN value to the largest LSN value to obtain the list of the recent changes (file events) in the filesystem. These detected file events may be passed to a downstream system. In yet another example operation to bring the logfile scanning module back to a consistent state, the logfile scanning module may begin capturing file events from the current point in time, in which case earlier file events may be skipped. In either of the above examples of bringing the logfile scanning module back to a consistent state, the checkpoint LSN may be updated with the highest LSN value present in the logfile.

If a checkpoint LSN is found in the logfile, the logfile scanning module may loop through the logfile to identify each LSN that is higher than the checkpoint LSN. For each of these LSNs, the logfile scanning module may identify the file path by parsing the MFT similar to the manner described with respect to the file stream scanning module, but using the LSN. The logfile scanning module may further identify the file event associated with the LSN by parsing the logfile, which may have a similar structure and encoding as the sparse file stream. The logfile scanning module may feed any detected file events to a downstream system and update the checkpoint LSN with the highest LSN.

The logfile scanning module may start a poll on the logfile to determine any changes made to it. Whenever a change is made to any of the files in the filesystem, the logfile is updated as part of journaling by the filesystem. Any such detected changes will result in initiation of the logfile scanning module. Thus, polling and/or scanning of the filesystem itself is minimized and may be initiated only when changes to the files are made and documented in the logfile.

The velocity-based scanning module may determine whether to initiate a filesystem scan (and/or the file stream scanning module or logfile scanning module) based on activity density of the filesystem. In some examples, the velocity-based scanning module may be used when the file stream scanning module and/or the logfile scanning module functionality is unavailable, such as when a journaling filesystem is not used. To optimize scan and system performance, the velocity-based scanning module may update a density datastore that stores details of all scanned files and the last processing status for each scan. Based on the processing status and last modified time, files are marked as candidate files for further processing. Candidate files are potentially modified files or new files that are to be processed. The velocity-based scanning module may determine an activity density percentage for a given directory. The activity density percentage may be determined based on a candidate file count in a directory divided by the total file count for the directory.

The velocity-based scanning module may determine the subsequent scanning time based on this percentage. For example, the velocity-based scanning module may scan more active folders more frequently than less active folders. The velocity-based scanning module may determine an amount of time between two consecutive scans based on the file activity percentage.

BRIEF DESCRIPTION OF THE DRAWINGS

Features of the present disclosure may be illustrated by way of example and not limited in the following figure(s), in which like numerals indicate like elements, in which:

FIG. 4 illustrates an example of the start of parsed record in the encoded sparse file stream;

FIG. 5A illustrates a portion of an example of an MFT;

FIG. 5B illustrates another portion of an example of an MFT;

DETAILED DESCRIPTION

Figure 1:
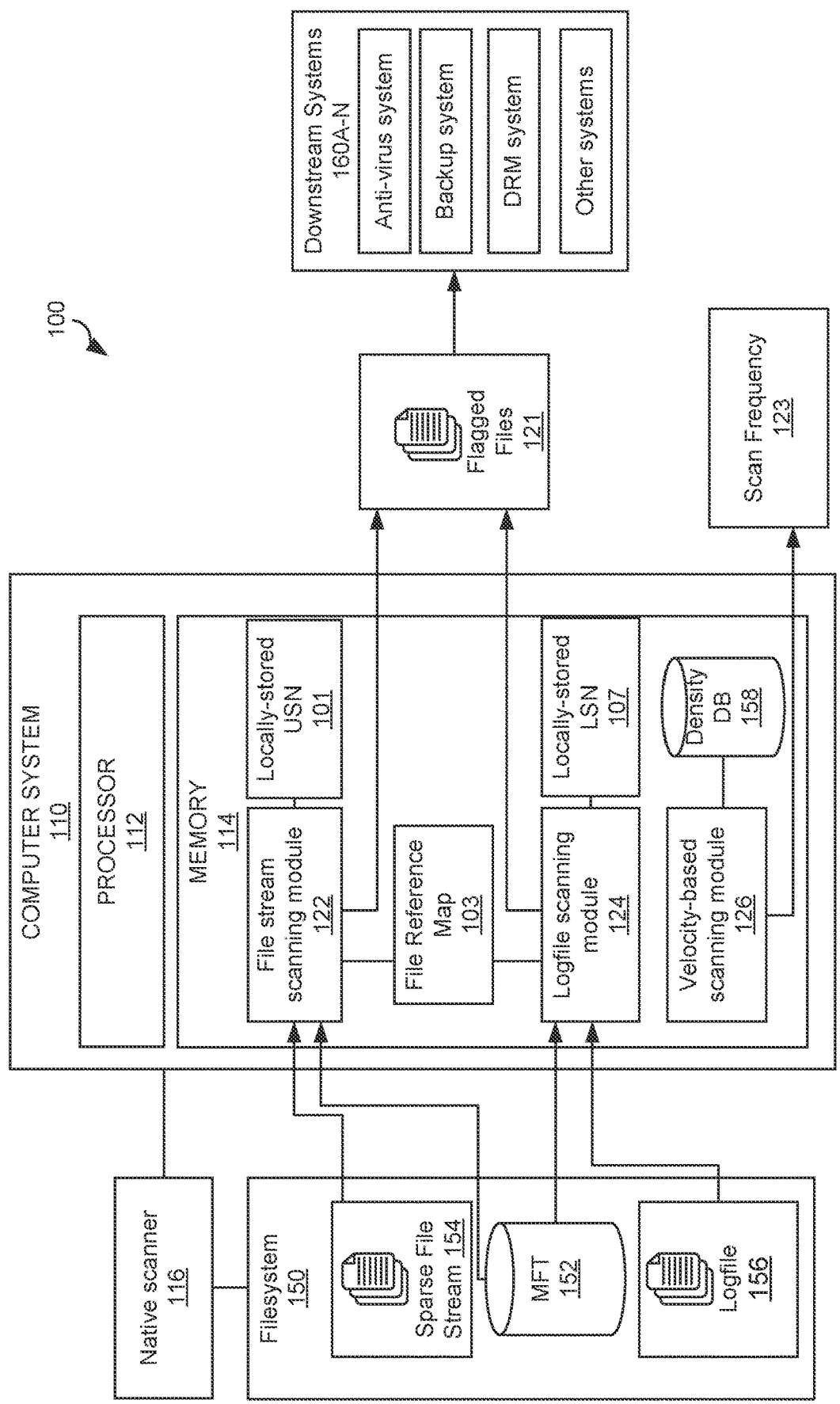
FIG. 1 illustrates an example of a computer environment for efficiently scanning a filesystem.

FIG. 1 illustrates an example of a computer environment 100 for efficiently scanning a filesystem 150. The computer environment 100 may include a computer system 110, a filesystem 150, and/or other features. The filesystem 150 may be a journaling filesystem such as the New Technology File System (NTFS), although other types of journaling filesystems may be used.

The computer system 110 may periodically identify flagged files 121 based on file events based on efficiently scanning the filesystem 150. File events may include, without limitation, a creation, a deletion, a modification, and/or other events relating to files or directories on the filesystem 150. The computer system 110 may pass the flagged files 121, file events, and/or other information related to the file events to one or more downstream systems 160.

A downstream system 160 is a system that performs a file-related function based on file events. Examples of a downstream system 160 include an anti-virus system that detects files infected with viruses or malicious code, a backup system that performs a file backup, a DRM system that performs digital protection on files, and/or other types of systems that perform a function relating to files responsive to file events. It should be noted that the various features of the computer environment 100, while shown as separate components, may be implemented together. For example, the computer system 110, the filesystem 150, and the downstream system 160, and/or any of the components of these components may be combined together into a single system.

The computer system 110 may minimize or eliminate filesystem polling, reducing computational load on the filesystem 150 and related systems that poll the filesystem. In particular, the computer system 110 may reduce instances of redundant or unnecessary scans. In some instances, the computer system 110 may adjust the frequency of filesystem checks and/or actual filesystem scans based on a velocity of activity on the filesystem 150. In these instances, the computer system 110 may fine-tune the frequency of the checks and/or actual scans to further improve scanning efficiency. In particular, in response to low velocity activity, the computer system 110 may reduce the frequency of checks and/or scans to further reduce computational overhead. On the other hand, in response to high velocity activity, the computer system 110 may increase the frequency of checks and/or scans to improve sensitivity of a downstream system 160. For example, filesystem backup systems may perform data backup processes more frequently for portions of filesystems that exhibit high activity, enabling backup copies for frequently changing portions of filesystems. In another example, network security systems may perform more frequent antivirus and/or other security processes for portions of filesystems that exhibit high activity, improving the security of these portions and related computer systems.

To perform these and other functions, the computer system 110 may include a processor 112, a memory 114, a native scanner 116, a file stream scanning module 122, a logfile scanning module 124, a velocity-based scanning module 126, and/or other components. The processor 112 may be a semiconductor-based microprocessor, a central processing unit (CPU), an application specific integrated circuit (ASIC), a field-programmable gate array (FPGA), and/or other suitable hardware device. Although the computer system 110 has been depicted as including a single processor 112, it should be understood that the computer system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals.

The native scanner 116, the file stream scanning module 122, the logfile scanning module 124, and the velocity-based scanning module 126 may each be implemented as instructions, stored in the memory 114, that specifically programs the processor 112 to perform the functions described with respect to those instructions. Alternatively, or additionally, the native scanner 116, the file stream scanning module 122, the logfile scanning module 124, and the velocity-based scanning module 126 may each be implemented in hardware to perform the functions.

The native scanner 116 is a file scanner that scans a filesystem 150 based on native capabilities of an operating system. For example, the native scanner 116 may leverage the built-in functionality provided by the operating system to scan files for various purposes such as virus detection, malware analysis, content inspection, or system optimization. Native file scanners are designed to work directly with the file system of the operating system they are built for, utilizing the available APIs and system calls to access and analyze files. This allows them to have a deep understanding of the file structures, attributes, and metadata provided by the operating system identifies one or more filesystem events of a file object in the filesystem 150. A file object may include a file, a directory, and/or other data that is maintained by the filesystem 150. A filesystem event is an action made to the file object. The native scanner 116 may identify modifications to files based on file matching techniques such as hash matching, determining last modified times, and/or other file modification techniques. The computer system 110 may use the native scanner 116 as a default or backup scanner to the scanning subsystems 122-126 described herein. In some examples, the velocity-based scanning module 126 may use the native scanner 116 using velocity-based determinations of when such scanning is appropriate.

The file stream scanning module 122 may identify one or more flagged files 121 based on a sparse file stream 154 from the filesystem 150. Newer records are appended at the end of the sparse file stream 154. The sparse file stream 154 may store Update Sequence Numbers (USNs) that are each unique for every record added to the sparse file stream 154. The USN is also the byte offset of the record that it is identifying (offset from the beginning of the sparse file stream 154). Because the sparse file stream 154 is a sparse file and the new records are always written to the end, this offset can logically become large without consuming increasing amounts of disk space. Thus, the actual size of the sparse file stream 154 may be maintained at a certain size, such as substantially 42 MB. When new records are written to the end of the sparse file stream 154, records at the start of the sparse file stream 154 are turned to null bytes, freeing up disk space is freed up as a functionality of sparse file.

Table 1 illustrates an example of the structure of a record in the sparse file stream 154.

| Attribute | Size (in bytes) |
| --- | --- |
| Size of entry | 4 |
| Major version | 2 |
| Minor version | 2 |
| MFT record reference | 8 |
| MFT parent record reference | 8 |
| Offset of current entry (USN) | 8 |
| Timestamp of event | 8 |
| Reason | 4 |
| SourceInfo | 4 |
| SecurityID | 4 |
| File attributes | 4 |
| Size of filename | 2 |
| Offset to filename from the beginning of this record | 2 |
| Filename (not null terminated) | [size of the file] |

Figure 2:
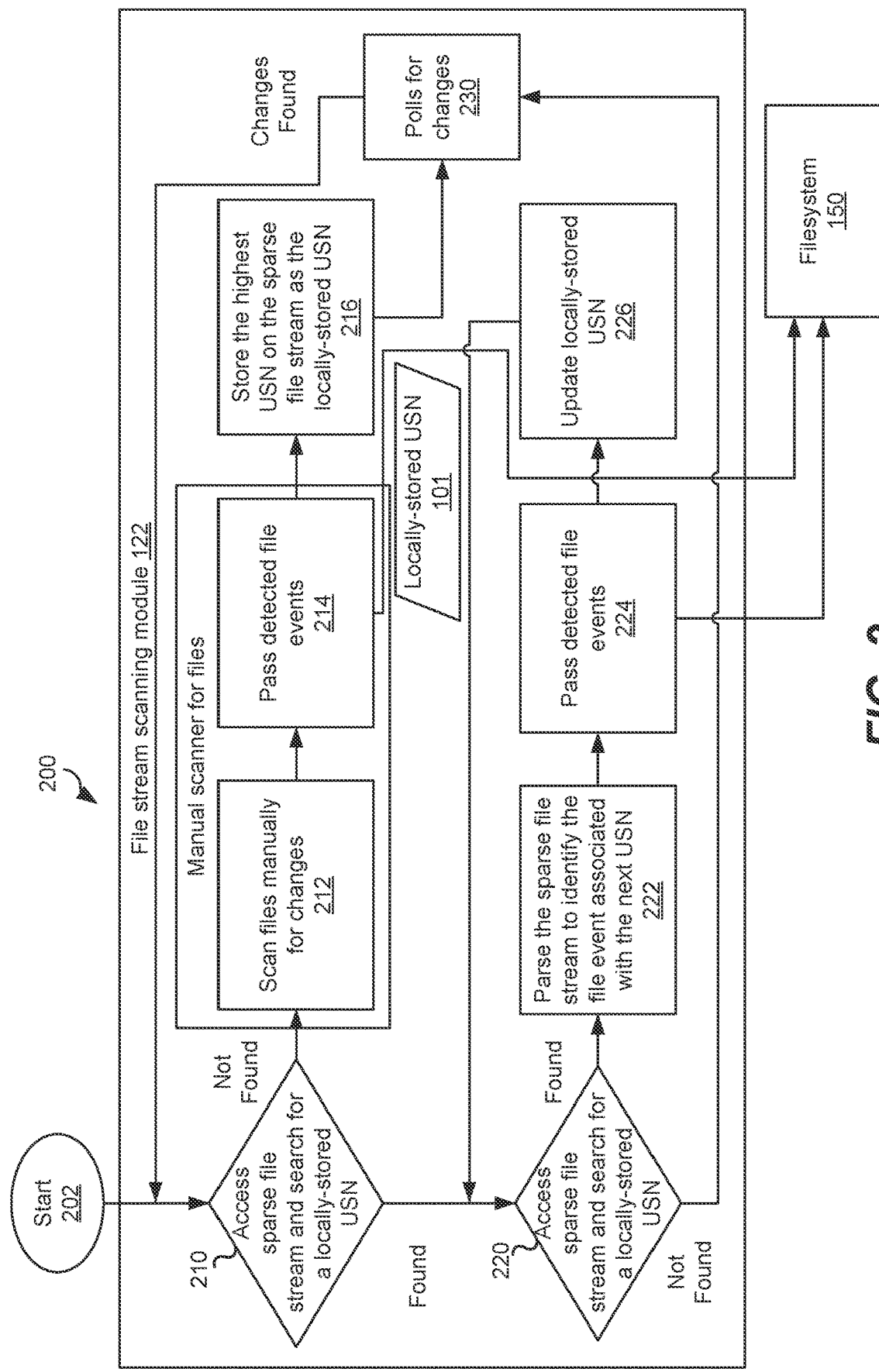
FIG. 2 illustrates a schematic diagram of an architecture for scanning a filesystem based on sequence numbers in a file stream.

To illustrate operation of the file stream scanning module 122 based on a sparse file stream 154, attention will turn to FIG. 2, which illustrates a schematic diagram of an architecture 200 for scanning a filesystem 150 based on USNs in a sparse file stream 154. At 202, the file stream scanning module 122 may initiate a filesystem check. This filesystem check will be referred to as a "current filesystem check." A prior filesystem check will refer to the filesystem check that was performed immediately prior to the current filesystem check.

At 210, the file stream scanning module 122 may access the sparse file stream 154 and search for a locally-stored USN 101 in the sparse file stream 154. If a match is not found, meaning that a locally-stored USN 101 does not exist in the sparse file stream 154, the file stream scanning module 122 may invoke the native scanner 116. At 212, the native scanner 116 may scan the filesystem 150 for filesystem events. At 214, the native scanner 116 may pass any detected filesystem events to a process that acts on the filesystem events. An example of the process is a downstream system 160 illustrated in FIG. 1. At 216, the file stream scanning module 122 may store the highest USN from the sparse file stream 154 as the locally-stored USN 101, thereby updating the state of the file stream scanning module 122 to avoid an unnecessary native scan. At 230, the file stream scanning module 122 may poll the filesystem 150 for the detected file events passed from 214 to determine whether the highest USN is greater than the locally-stored USN 101. If yes, then process may return back to 210.

Returning to 210, if a matching locally-stored USN 101 is found in the sparse file stream 154, then at 220, the file stream scanning module 122 may identify the first USN that is higher than the locally-stored USN 101 (hereinafter "next USN"). At 222, the file stream scanning module 122 may parse the sparse file stream 154 to identify the file event associated with the next USN.

Parsing Records of the Sparse File Stream 154

Figure 3:
FIG. 3 illustrates an example of an encoded sparse file stream.

The beginning of the sparse file stream 154 may include sparse data that can be skipped from processing. If the sparse file stream 154 has been parsed at least once, the file stream scanning module 122 may directly skip to the last USN processed by treating it as the offset (in bytes) from the beginning of the file stream. If the sparse file stream 154 is being parsed for the first time, the file stream scanning module 122 may skip to the first non-zero 4-byte integer, an example of which is illustrated in FIG. 3.

Based on the record structure of the sparse file stream 154, the file stream scanning module 122 may interpret record bytes. These values may be little-endian, except for the value corresponding to the filename. An example of a parsed record, beginning at 286226544, is highlighted in FIG. 4.

Table 2 shows examples of values of the parsed record shown in FIG. 4.

| Attribute | Size (in bytes) | Interpreted value | Interpreted value (Hex) |
|---|---|---|---|
| Size of entry | 4 | 104 (decimal) | 0x00000068 |
| Major version | 2 | 2 (decimal) | 0x0002 |
| Minor version | 2 | 0 (decimal) | 0x0000 |
| MFT record reference | 8 | Not required | 0x000200000003C8CC |
| MFT parent record reference | 8 | Not required | 0x01FC00000000E3C4 |
| Offset of current entry (USN) | 8 | 286226552 | 0x00000000110F7878 |
| Timestamp of event | 8 | 2023-04-03 23:31:57 (UTC + 5:30) (timestamp) | 0x01D9665661BF6FA7 |
| Reason | 4 | 256 (decimal) | 0x00000100 |
| SourceInfo | 4 | 0 (decimal) | 0x00000000 |
| SecurityID | 4 | 0 (decimal) | 0x00000000 |
| File attributes | 4 | 32 (decimal) | 0x00000020 |
| Size of filename | 2 | 42 (decimal) | 0x002A |
| Offset to filename from the beginning of this record | 2 | 60 (decimal) | 0x003C |
| Filename (not null terminated) | Size of filename (42) | New Text Document.txt | Not required |

The beginning of subsequent records will be aligned in multiples of 8 bytes. In the above parsed file record, the filename ends at offset 286226653, however, the next record begins from 286226656.

Identifying File Events

The Reason field of the $J record describes a file event that occurred for a corresponding file. The file stream scanning module 122 may detect various types of file events based on the Reason field. For example, the Reason field may be encoded as a bit string, bit array, or binary numeral. The file stream scanning module 122 may perform bitwise decoding to identify the type of event.

Table 3 illustrates examples of bitwise encoding of the Reason field, which is decoded to identify the type of file event.

| Type of File Event | Bitwise Encoding | Description |
|---|---|---|
| File Creation | 0x00000100 | USN_REASON_FILE_CREATE - The file or directory is created for the first time. |
| File Deletion | 0x00000200 | USN_REASON_FILE_DELETE - The file or directory is deleted. |
| File Rename | 0x00002000 | USN_REASON_RENAME_NEW_NAME - A file or directory is renamed, and the file name in the USN_RECORD_V2 structure is the new name. |

-continued

| Type of File Event | Bitwise Encoding | Description |
|---|---|---|
| File Update | 0x00000001 | USN_REASON_DATA_OVERWRITE - The data in the file or directory is overwritten. |
| File Update | 0x00000002 | USN_REASON_DATA_EXTEND - The file or directory is extended (added to). |
| File Update | 0x00000004 | USN_REASON_DATA_TRUNCATION - The file or directory is truncated. |
| File Update | 0x00000010 | USN_REASON_NAMED_DATA_OVERWRITE - The data in one or more named data streams for a file is overwritten. |
| File Update | 0x00000020: | USN_REASON_NAMED_DATA_EXTEND - The one or more named data streams for a file are extended (added to). |
| File Update File Update | 0x00000040 | USN_REASON_NAMED_DATA_TRUNCATION - The one or more named data streams for a file is truncated. |
| File Update | 0x00200000: | USN_REASON_STREAM_CHANGE - A named stream is added to or removed from a file, or a named stream is renamed. |
| File Update | 0x00400000 | USN_REASON_TRANSACTED_CHANGE - The given stream is modified through a TxF transaction. |

Determining the File Path of Files Having Detected File Events

The file stream scanning module 122 may obtain the file path of a file having a detected event from the MFT 152 based on the USN. Table 4 illustrates an example of the structure of the MFT 152. Other fields and data are omitted for clarity.

| Attribute | Offset from current record beginning | Size (in bytes) | Value |
|---|---|---|---|
| Signature | 0 | 4 | FILE |
| Sequence Number | 16 | 2 | |
| Record status flag | 22 | 2 | 0- File deleted<br>1- File in use<br>2- Folder deleted<br>Folder in use |
| Base master file table record | 32 | 8 | 0: Base record<br>Non zero: Child record. Value of this field tells the parent reference number in this case. |
| ID of this record | 44 | 4 | |
| Filename attribute block (also called $30) | 152 | Filename attribute block size | Signature "30 00 00 00" |
| Filename attribute block size | 156 | 4 | |
| Parent directory file record number | 176 | 6 | |
| Parent directory sequence number | 182 | 4 | |
| Filename length | 240 | 1 | |
| Filename namespace | 241 | 1 | 0- Posix<br>1- Win32<br>2- DOS<br>Win32 & DOS |
| Filename | 242 | Filename length | |

Building the File Reference Map 103 for File Path Retrieval

The file stream scanning module 122 may generate the file reference map 103 based on the file reference number, corresponding file or folder name, and parent reference number. For example, each mapping in the file reference map may be a key-value pair having the form:

Key: <FileReferenceNumber>,
Value: <correspondingFileOrFolderName, ParentReferenceNumber>.

Figure 5B:
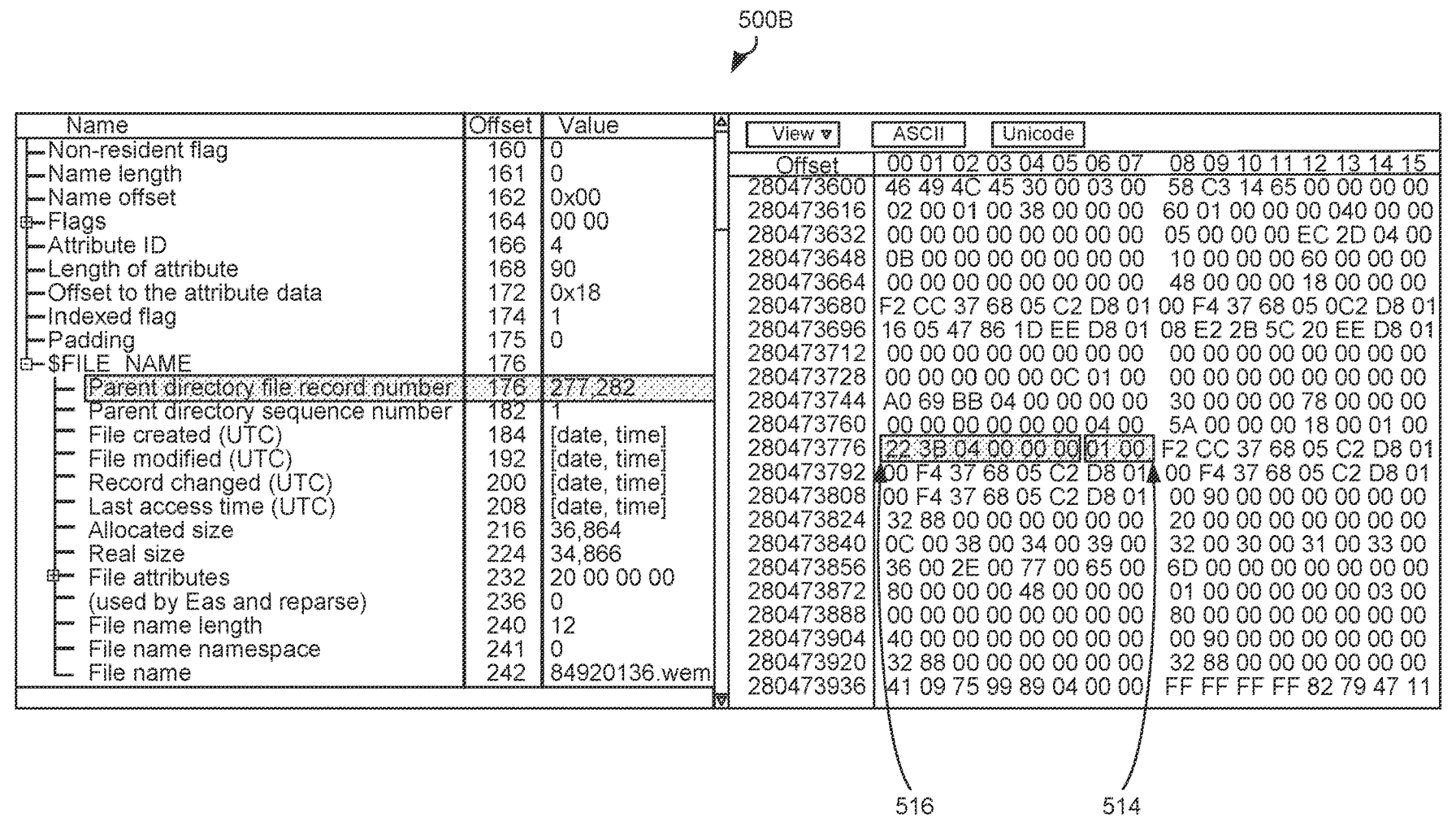

The file stream scanning module 122 may parse the MFT 152 to obtain values for the file reference map 103. Examples of portions of the MFT 152 will be described with reference to FIGS. 5A and 5B. For example, FIG. 5A illustrates a portion of an example of an MFT 152.

1. "Signature" at offset 0 (address 280473600) is 46 49 4C 45 (translates to FILE) is illustrated at block 502.

2. "Sequence number" at offset 16 (address 280473616) is 02 00 (first portion of File Reference number in LE, or 00 02) is illustrated at block 504.

3. "ID of this record" at offset 44 (address 280473644) is EC 2D 04 00 (last portion of File Reference number in LE, or 00 04 2D EC) is illustrated at block 506.

The File Reference Number is given by: Sequence number ("00 02")+pad ("00 00")+ID of this record ("00 04 2D EC"). Thus, taken together, the File Reference Number as parsed from the illustrated portion of an MFT 152 in FIG. 5A is "00 02 00 00 00 04 2D EC."

FIG. 5B illustrates another portion of an example of an MFT 152. Data from this portion of the MFT 152 may be mapped in a manner similar to FIG. 5A. The only difference in parsing the Parent Reference Number from FIG. 5B is the padding in some cases, which is 1 byte ("00") instead of 2 bytes ("00 00"). The file reference number and parent reference number are of size 8 bytes. The difference in padding is because "Parent directory file record number" (last portion of Parent reference number) consists of 6 bytes but the "ID of this record" (last portion of file reference number) consists of 4 bytes only. Parsing the illustrated portion of FIG. 5B results in a parent reference number of "00 01 00 00 00 00 04 3B 22") based on block 514+padding ("00")+block 516.

The file stream scanning module 122 may:
1. While the MFT 152 has records:
   a. Read the current MFT record. Each MFT record may be N bytes across one or more sectors, where N is an integer. For example, each MFT record may be 1024 bytes across 2 sectors, where each sector is 512 bytes.
   b. Parse the current MFT record based on the MFT structure, an example of which was previously illustrated in Table 4.
      i. FileReferenceNumber (in string format) may be determined based on the following:
         MFTRecord.SequenceNumber (in hex)+"0000"+MFTRecord.IdOfThisRecord (in hex) This gives a string of length 8 which is equivalent of the 8 bytes hex number, as illustrated in FIG. 5A. 0x0002 0000 00042DEC
      ii. The correspondingFileOrFolderName is the same as MFTRecord.Filename
      iii. The ParentReferenceNumber (string format) may be determined based on the following:
         MFTRecord.ParentDirectorySequenceNumber (in hex)+MFTRecord.ParentDirectoryFileRecordNumber (in hex) This gives a string of length 8 which is equivalent of the 8 bytes hex number, as illustrated in FIG. 5B. 0x0001 000000043B22
2. Exceptions:
   a. If Record status flag is 0 or 2, file/folder is deleted, and we don't need to add the entry in map.
   b. If Base master file table record is not 0, the record is an extension record of some other base file record. So, it can be skipped from adding in the map.
3. For systems where DOS filepaths are enabled by default, 2 File name attribute blocks exist one after another. Whichever of them contains the long file pathname, could be considered to create the map.
4. Keeping the FileReferenceMap up to date:
   a. For each event encountered via sparse file stream 154:
      i. If File creation event, add the record MFT reference, parent MFT reference & fileName in FileReferenceMap.
      ii. If File deletion event, remove the record MFT reference from FileReferenceMap.
      iii. If File rename event (captures rename & move operations)
         1. File rename: update the correspondingFileOrFolderName of the MFT reference in FileReferenceMap
         2. Move operation: update the ParentReferenceNumber corresponding the FileReferenceNumber in fileReferenceMap. (FileReferenceMap[FileReferenceNumber]={corresponding FileOrFolderName, new ParentReferenceNumber})
5. Serving filepath queries using FileReferenceMap
   a. Assuming $Jrecord is the record for which we want to get the filePath.
   b. filePath=" "
   c. MFTRecordReference=$Jrecord.MFTRecordReference
   d. Do
      i. filePath="\\"+FileReferenceMap[MFTRecordReference].correspondingFileOrFolderName+filePath
      ii. MFTRecordReference=FileReferenceMap[MFTRecordReference].ParentReferenceNumber
   e. While(MFTRecordReference doesn't point to the root directory i.e., ".") //FileReference of root directory is usually 0x0005000000000005

If File update event, do nothing.

At 224, the file stream scanning module 122 may pass the file event for processing. At 226, the file stream scanning module 122 may checkpoint the next USN. That is, the file stream scanning module 122 may store the next USN as the locally-stored USN 101.

At 226, the file stream scanning module 122 may update the locally-stored checkpoint USN 101.

Figure 6:
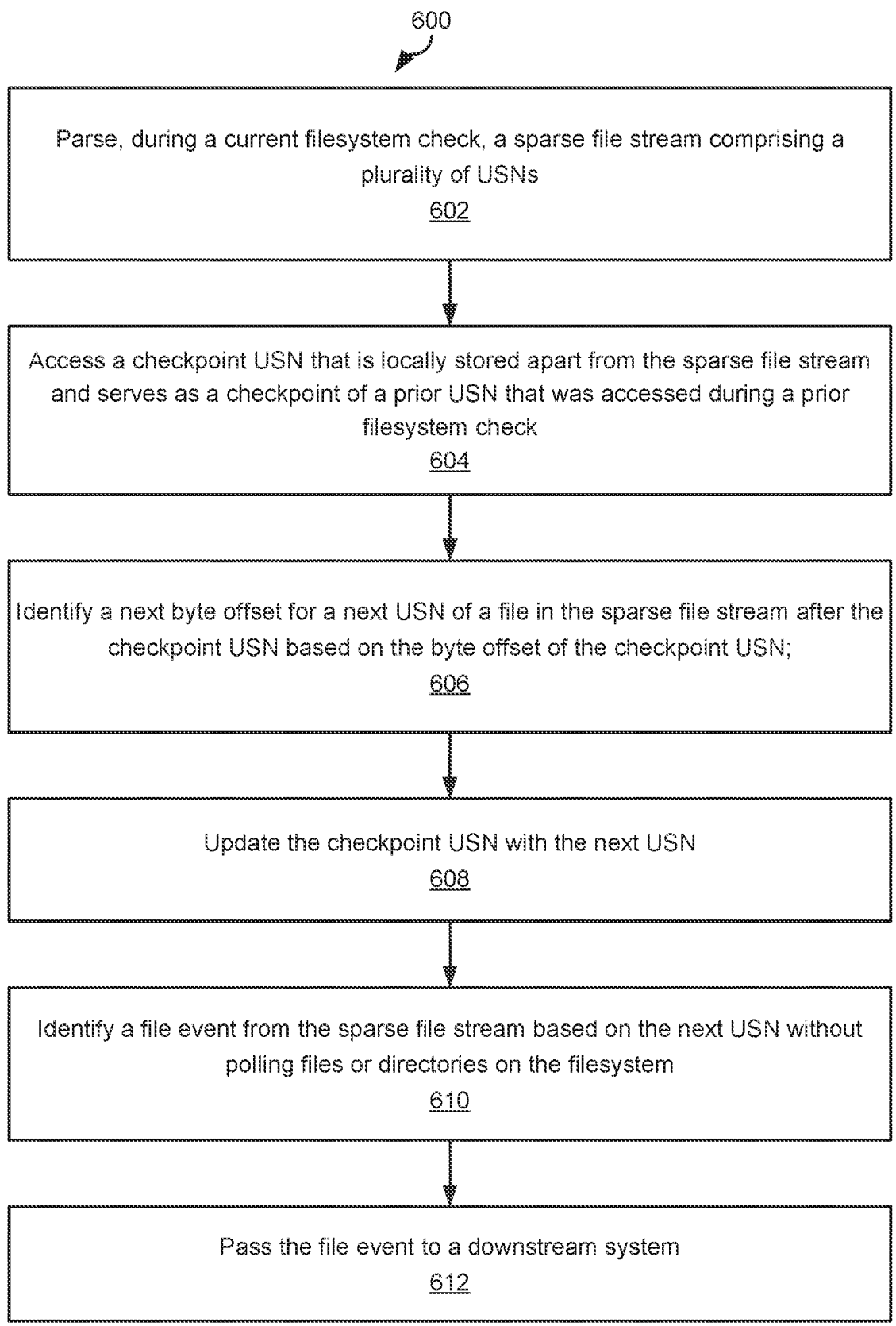
FIG. 6 illustrates a method of USN-based checking to determine file events in the filesystem 150 while minimizing or eliminating filesystem polling.

FIG. 6 illustrates a method 600 of USN-based checking to determine file events in the filesystem 150 while minimizing or eliminating filesystem polling. At 602, the method 600 may include parsing, during a current filesystem check, a sparse file stream comprising a plurality of USNs. Each USN may have a respective byte offset from a beginning of the sparse file stream and identifying a file in the filesystem associated with a file event, wherein each time the file is added or modified, the USN for the file is incremented to indicate that a change has occurred. At 604, the method 600 may include accessing a checkpoint USN (such as the checkpoint USN 101) that is locally stored apart from the sparse file stream and serves as a checkpoint of a prior USN that was accessed during a prior filesystem check.

At 606, the method 600 may include identifying a next byte offset for a next USN of a file in the sparse file stream after the checkpoint USN based on the byte offset of the checkpoint USN. At 608, the method 600 may include updating the checkpoint USN with the next USN. At 610, the method 600 may include identifying a file event from the sparse file stream based on the next USN without polling files or directories on the filesystem. At 612, the method 600 may include passing the file event to a downstream system (such as a downstream system 160).

Figure 7:
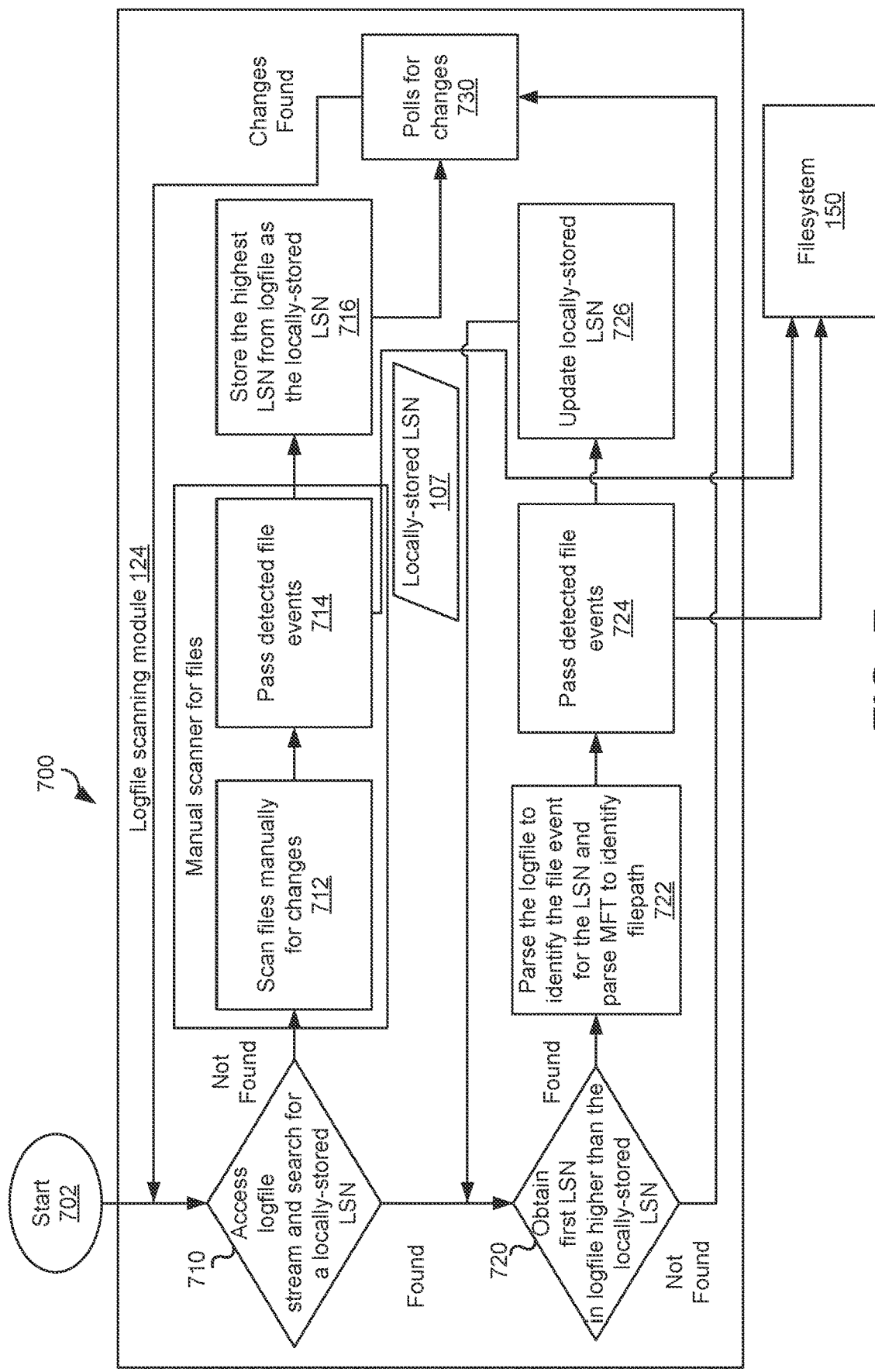
FIG. 7 illustrates a schematic diagram of an architecture for scanning a filesystem based on a logfile of the filesystem.

In addition to or instead of the file stream scanning module 122, the computer system 110 may use the logfile scanning module 124 to identify a set of one or more flagged files 121. An example of the logfile scanning module 124 will be described with reference to FIG. 7. FIG. 7 illustrates a schematic diagram 700 of an architecture for scanning a filesystem 150 based on a logfile 156 of the filesystem.

At 702, the logfile scanning module 124 may boot up to initiate operations. At 710, the logfile scanning module 124 may access the logfile 156 and search for a locally-stored LSN 107 in logfile 156. The locally-stored LSN 107 (also referred to interchangeably as "checkpoint LSN 107") is stored/cached by the logfile scanning module 124 as a checkpoint to all the metadata changes in the filesystem that have already been parsed/scanned. If a match is not found, the state of the logfile scanning module 124 may be outdated. This will also be referred to as the logfile scanning module 124 being in an inconsistent state. For example, there may be changes to the filesystem 150 that have not been accounted for. To detect these changes and to bring the logfile scanning module 124 back to a consistent state, at 712 and 714, a native scanner 116 may be invoked and any detected file events may be passed to a downstream process, similar to the manner described at 212 and 214 of FIG. 2. Alternatively or additionally, to bring the logfile scanning module 124 back to a consistent state, the logfile scanning module 124 may parse and loop through the logfile 156 from the smallest LSN value to the largest LSN value to obtain the list of the recent changes (file events) in the filesystem 150. These detected file events may be passed to the downstream process. In yet another example operation to bring the logfile scanning module 124 back to a consistent state, the logfile scanning module 124 may begin capturing file events from the current point in time, in which case earlier file events may be skipped.

In either of the above examples of bringing the logfile scanning module 124 back to a consistent state, the checkpoint LSN 107 may be updated with the highest LSN value present in the logfile 156.

Returning to 710, if a checkpoint LSN 107 is found in the logfile 156, meaning that the state of the logfile scanning module 124 is up to date, the logfile scanning module 124 may proceed to 720. At 720, the logfile scanning module 124 may loop through the logfile 156 to identify each LSN that is higher than the checkpoint LSN 107. At 722, for each of these LSNs, the logfile scanning module 124 may identify the file path by parsing the MFT 152 similar to the manner described at 222 of FIG. 2 but using the checkpoint LSN 107. The logfile scanning module 124 may further identify the file event associated with the LSN by parsing the logfile 156. At 724, the logfile scanning module 124 may feed any detected file events to a downstream process, similar to 224 of FIG. 2. At 726, the logfile scanning module 124 may update the checkpoint LSN 107 with the highest LSN to place the logfile scanning module 124 in a consistent state.

At 730, the logfile scanning module 124 may start a poll on the logfile 156 to determine any changes made to it. Whenever a change is made to any of the files in the filesystem 150, logfile 156 is updated as part of journaling by the filesystem 150. Any such detected changes will result in repeat of 710. Thus, polling and/or scanning of the filesystem 150 itself is minimized and may be initiated only when changes to the files are made and documented in the logfile 156.

Figure 8:
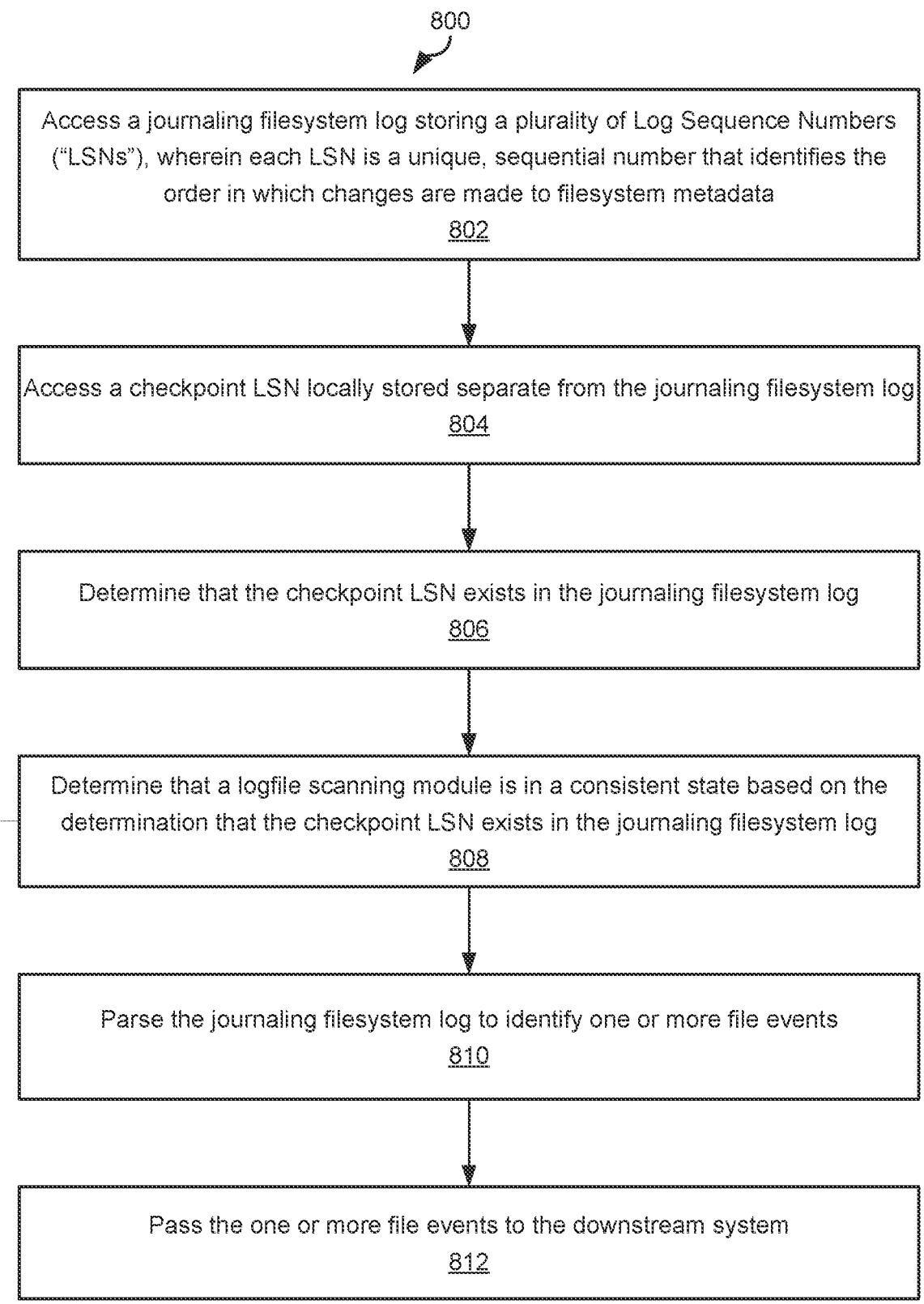
FIG. 8 illustrates a method of log-based checking to determine file events in the filesystem 150 while minimizing or eliminating filesystem polling.

FIG. 8 illustrates a method 800 of log-based checking to determine file events in the filesystem 150 while minimizing or eliminating filesystem polling. At 802, the method 800 may include accessing a journaling filesystem log (such as the logfile 156) storing a plurality of Log Sequence Numbers ("LSNs"), wherein each LSN is a unique, sequential number that identifies the order in which changes are made to filesystem metadata. At 804, the method 800 may include accessing a checkpoint LSN (such as the checkpoint LSN 107) locally stored separate from the journaling filesystem log. At 806, the method 800 may include determining that the checkpoint LSN exists in the journaling filesystem log. At 808, the method 800 may include determining that a logfile scanning module is in a consistent state based on the determination that the checkpoint LSN exists in the journaling filesystem log. At 810, the method 800 may include parsing the journaling filesystem log to identify one or more file events. At 812, the method 800 may include passing the one or more file events to the downstream system (such as a downstream system 160).

Velocity-Based Scans Using Filesystem Activity Density

The velocity-based scanning module 126 may determine whether to initiate a filesystem scan based on activity density of the filesystem 150 and determine a scan frequency 123. The scan frequency 123 may determine the frequency with which the filesystem 150 is scanned. To optimize scan and system performance, the velocity-based scanning module 126 may update a density datastore 158 that stores details of all scanned files and the last processing status for each scan. Based on the processing status and last modified time, files are marked as candidate files for further processing. Candidate files are potentially modified files or new files that are to be processed. The velocity-based scanning module 126 may determine an activity density percentage for a given directory. The activity density percentage may be determined based on a candidate file count in a directory divided by the total file count for the directory. In other examples, different groupings of files other than directories may be used.

The velocity-based scanning module 126 may determine the subsequent scanning time based on this percentage. For example, the velocity-based scanning module 126 may scan the more active folders more frequently than less active folders. The velocity-based scanning module 126 may determine an amount of time between two consecutive scans based on the file activity percentage brackets.

The directories or folders that are evaluated by the velocity-based scanning module 126 may be referred to as a "HotFolder." A HotFolder refers to a directory or folder on a filesystem 150 (such as on a computer on a local hard drive or remote file server) configured for enumeration. Each HotFolder may be scanned independent of all other HotFolders. In this example, scanning of a HotFolder will not wait for the completion of scanning of any other HotFolder. Dedicated scanning threads will be allocated to each of them to perform their own scanning. For each HotFolder scan, the density datastore 158 may store, among other data, scanning start time, end time, duration, unprotected, and total file count for each scanning cycle of every hot folder. A HotFolder server will refer to a device in which the velocity-based scanning module 126 may execute. A HotFolder Server may monitor multiple HotFolders across multiple network file servers. An example of velocity-based file scanning will be described with reference to FIG. 9 for illustration. However, other types of downstream system 160 may be used instead.

Figure 9:
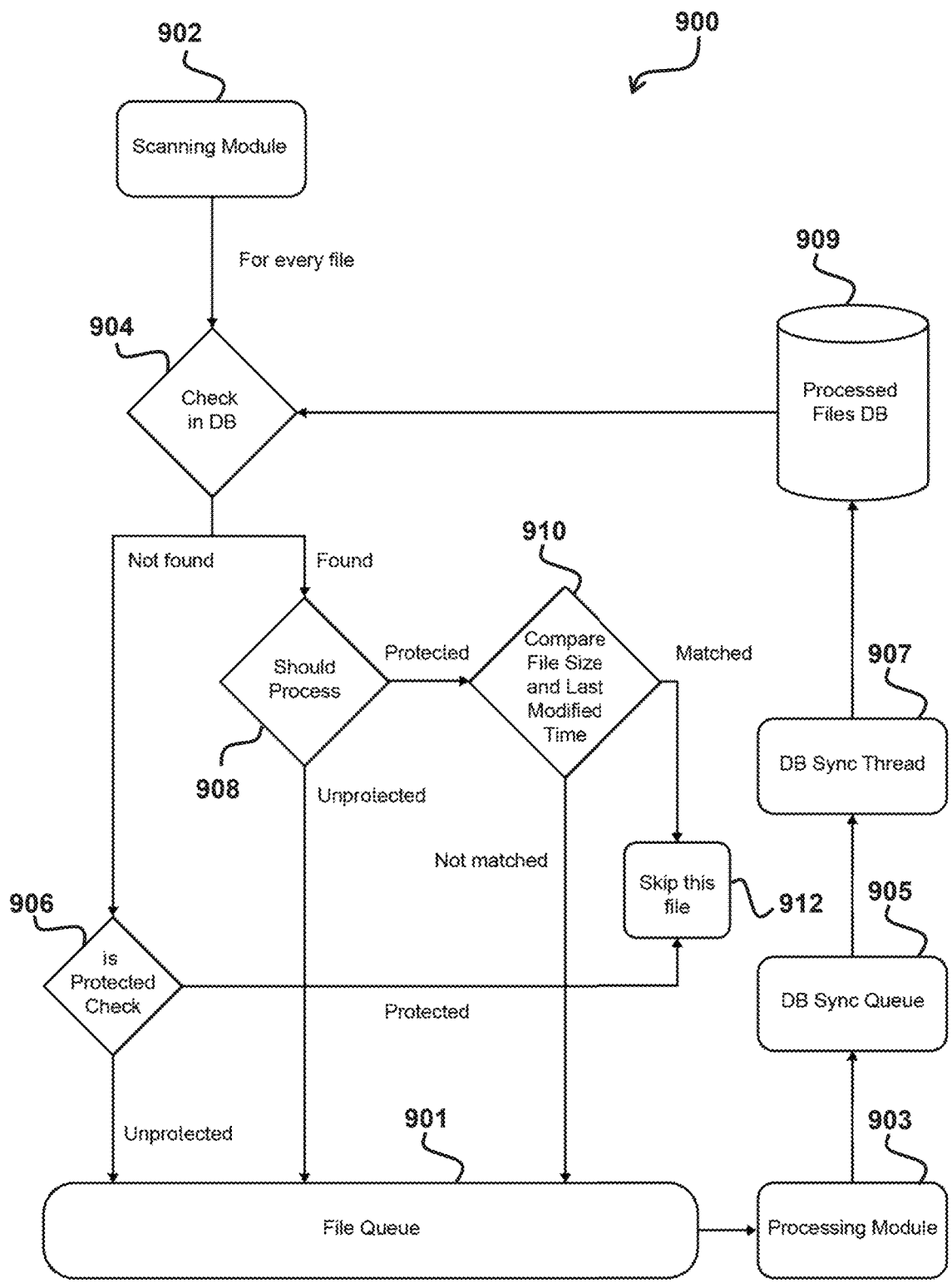
FIG. 9 illustrates a schematic diagram of an architecture for velocity-based file scanning in the context of file protection status checking.

FIG. 9 illustrates a schematic diagram 900 of an architecture for velocity-based file scanning in the context of file protection status checking. At 902, the velocity-based scanning module 126 may identify and initiate processing for each file. For example, the velocity-based scanning module 126 may identify files and folders in a HotFolder by using file finding utilities of an operating system. In one example, the velocity-based scanning module 126 may call the FindFirstFile( ) and FindNextFile( ) APIs provided by the WINDOWS operating system. Similar calls may be made to other operating systems as well. The FindFirstFile API searches a directory for a file or subdirectory with a name that matches a specific name (or partial name if wildcards are used). The FindNextFile API continues a file search from a previous call to the FindFirstFile API.

At 904, the velocity-based scanning module 126 may search for the file in the processed files DB 909. The processed files DB 909 is a database of files that have been processed by the velocity-based scanning module 126 to keep track of the files that were already scanned and/or file events that have been discovered.

At 906, if not found in the processed files DB 909, the file will be considered a new file and the protection status of the file is checked. For example, the velocity-based scanning module 126 may perform a file read operation to determine whether the file is protected. If protected, the file may be skipped at 908. If the file is unprotected, the velocity-based scanning module 126 may add the file to a file queue 901 for processing to be protected and to the processed files DB 909 of processed files.

Returning to 904, if the file is found in the processed files DB 909, then at 908, the velocity-based scanning module 126 may determine whether the file is protected, such as through a database lookup rather than using disk I/O. If unprotected, then the velocity-based scanning module 126 may add the file to the file queue 901. If protected, then at 910 the velocity-based scanning module 126 may verify whether any changes were made to the file. The verification is required in case file has been modified or replaced by another file and required to be processed for protection. For example, at 910, the velocity-based scanning module 126 may compare the file size and last modified time to prior known filesizes and prior known modified times. The prior known filesize and modified time may be stored and retrieved from the processed files DB 909. If both filesize and last modified time match, then the file is skipped at 912. If either do not match, then the velocity-based scanning module 126 may add the file to the file queue 901.

Once the files are processed by the velocity-based scanning module 126, the processing module 903 may process the files for protection (or other downstream system 160 may act on the files). Once protected, the velocity-based scanning module 126 may add the file to a database sync queue 905 that will cause the file's new size, last modified time and protection status to be updated in the velocity processed files DB 909. For example, a dedicated database (DB) sync thread 907 may perform a bulk commit of the records in the database sync queue 905 to the processed files DB 909.

The processed files DB 909 may be an SQLite database, although others may be used. Table 5 illustrates an example structure of the processed files DB 909.

| Columns | Data type | Primary | Unique | Index |
|---|---|---|---|---|
| Relative file path (relative to the HF it belongs) | String | Yes | | Yes |
| HF Id | String | Yes | | Yes |
| Last Modified Time | String | | | |
| File Size | Integer | | | |
| Protection Status | Integer | | | |

The DB sync queue 905 may be used to add or update records in a processed files database 909. New files will be added to the processed files database 909 through the DB sync queue 905. The status, file size and last modified time of files protected by processing module 903 will be updated in the database through the DB sync queue 905. In some examples, a global connection pool will be maintained for all modules that are to read or write into the processed files database 909. Each thread may use a separate database connection to work in Multi-threading mode. Each connection to this database will be opened with 'Read and Write' access, the DB sync thread 907 will also fetch a connection from this pool. Database connections will be opened with 'Shared Cache' mode enabled, to be able to read records present in 'uncommitted transactions' in DB Sync Thread 907.

The DB sync thread 907 may be a single writer thread, which may fetch records one by one from the DB sync queue 905. A single thread to manage DB modification may be used if there is a fixed limitation on the underlying database platform being used. Otherwise, multiple threads may be used for platforms that do not have such a limitation.

The DB sync thread 907 may use transactions to optimize write time. A fixed number of records (such as 1000) may be packaged in a single transaction and will be committed to the processed files database 909 as a bulk commit transaction. If the DB sync queue 905 becomes empty and the collected records are below 1000, those records will be committed in the database.

A HotFolder database may store scanning statistics ("stats") of each HotFolder. The HotFolder database may serve as a single global database for all HotFolders of a single HotFolder server. Table 6 illustrates an example of a structure of the HotFolder database.

| Columns | Data type | Primary | Unique | Index |
|---|---|---|---|---|
| Current date time | String | Yes | Yes | Yes |
| HF Id | String | | Yes | Yes |
| HF Path | String | | | |
| Number of Candidate files | Integer | | | |
| Number of Total files | Integer | | | |
| 'Is Protected' | Floating point value | | | |
| Average time | | | | |

Figure 10:
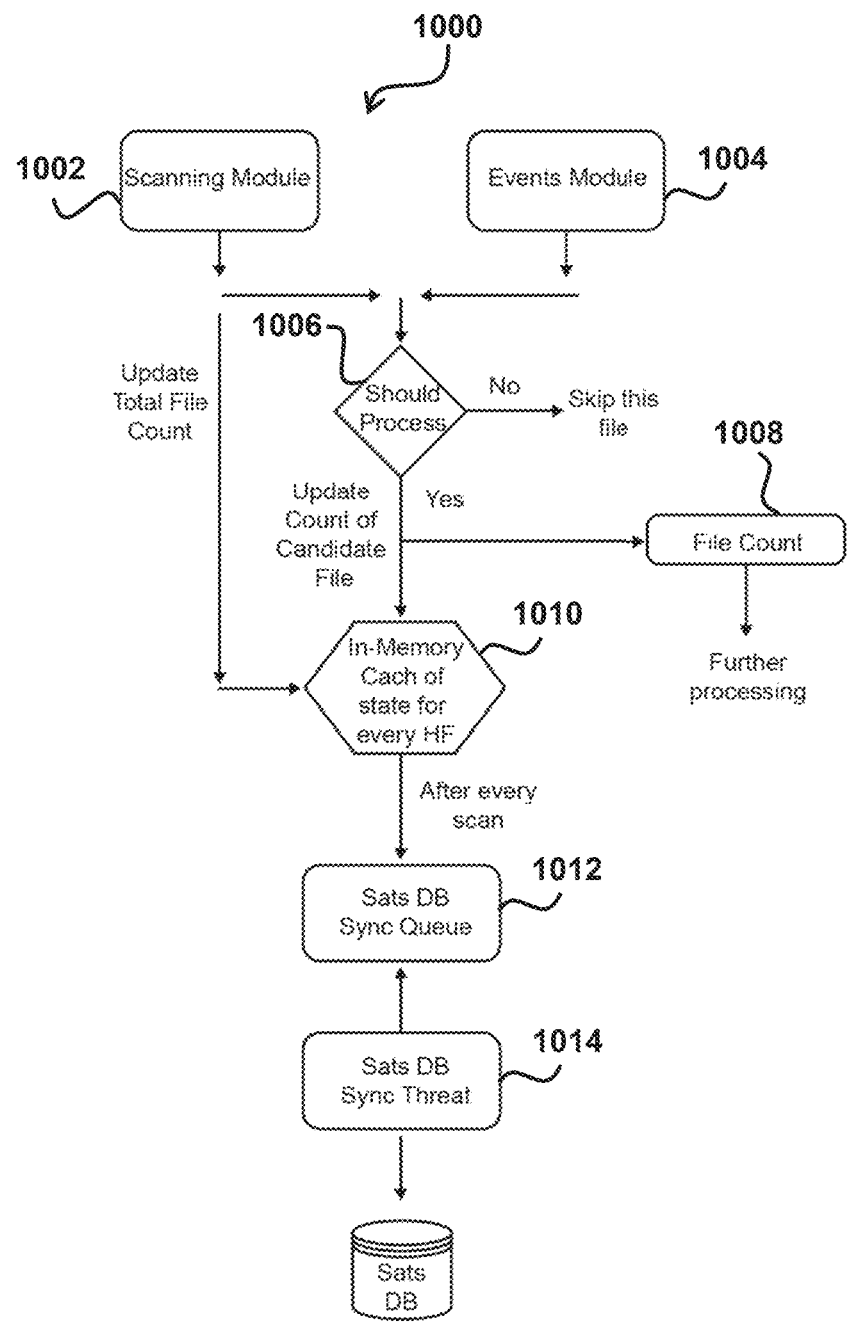
FIG. 10 illustrates a schematic diagram of a workflow for determining HotFolder statistics for velocity-based file scanning.

FIG. 10 illustrates a schematic diagram of a workflow for determining HotFolder statistics for velocity-based file scanning. At 1002, the velocity-based scanning module 126 may initiate and update the total file count based on a file (such as a new file) found on the filesystem 150. At 1004, an events module may identify a file for which a file event such as a modification is detected. At 1006, the velocity-based scanning module 126 may determine whether the file should be processed (such as whether the file is new or the file size and/or last modified time has changed since a prior scan). If not (such as no new file is detected or a file size and last modified time has not changed since a prior scan), the velocity-based scanning module 126 may skip the file. If the file is to be processed (such as when a new file is detected or a file size and last modified time has changed since a prior scan), then at 1008, the velocity-based scanning module 126 may consider the file to be a candidate file and update the count of candidate files. The velocity-based scanning module 126 may further add the file to a file queue for processing by a downstream filesystem processor (such as the downstream system 160 illustrated in FIG. 1).

At 1010, an in-memory stats cache will be maintained to avoid regular visits to a stats database. After scan completion of any individual HotFolder, its own stats will be synced into stats database. For example, a separate stats DB sync queue is maintained at 1012 for this operation. The stats DB sync queue is used to add entries of scanning details in stats database. The data may originate from scanning and/or the event module.

At 1014, a stats DB sync thread will sync all the records into stats database. The stats DB sync thread may be a single writer thread similar to the DB sync thread 907 illustrated in FIG. 9 (also similar to 907, the stats DB sync thread may be a multi-threaded writer depending on the database platform used). The stats DB sync thread may create a DB connection with Read/Write access, and may fetch records one by one from the stats DB sync queue. Transactions may be used to optimize write time. A fixed number of records (such as 10) will be packaged in a single transaction and will be committed in the stats database as a single bulk transaction. If the stats DB sync queue gets empty and collected records are below 10, these records (not 10) will be committed in the stats DB.

Figure 11:
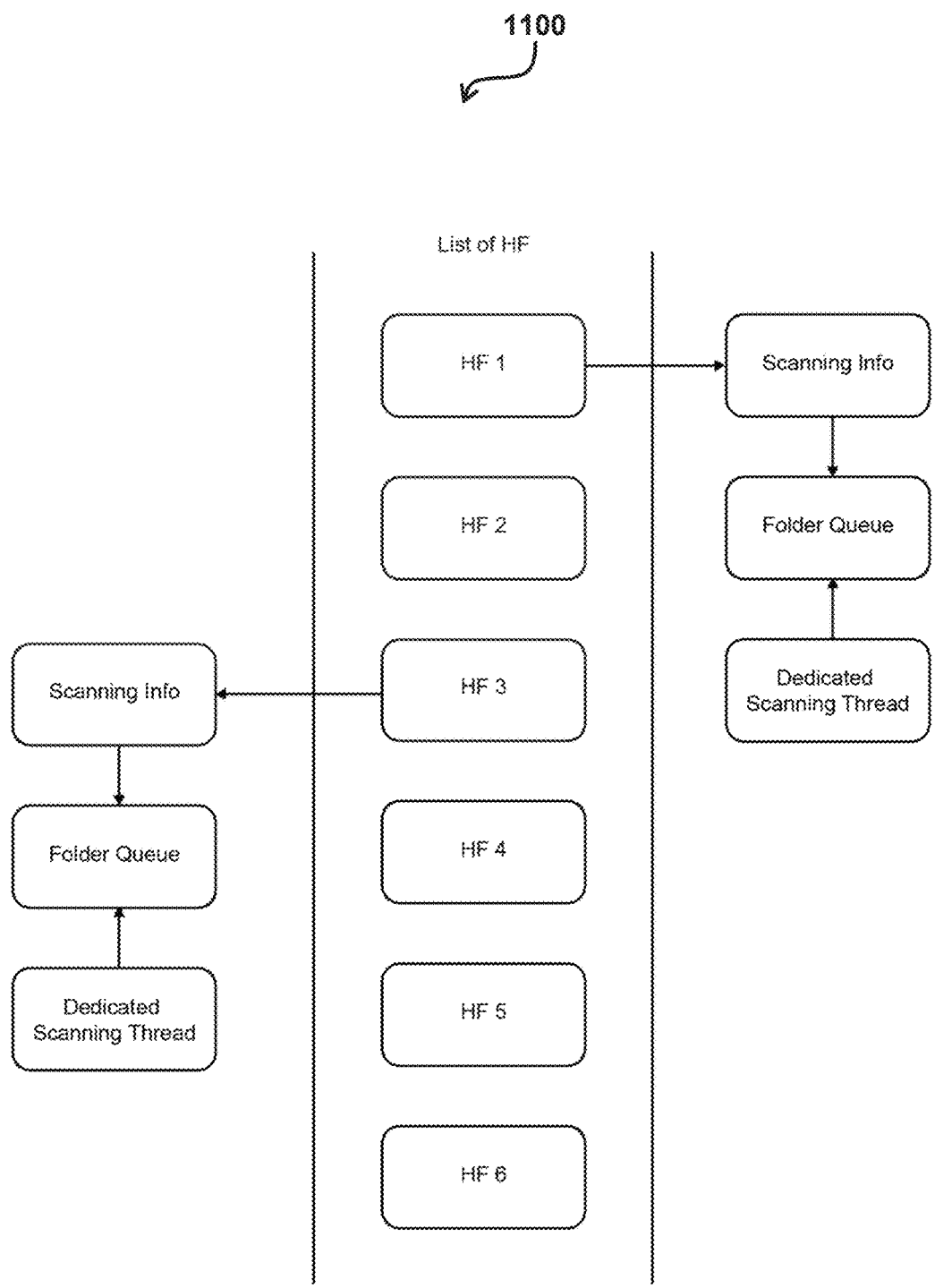
FIG. 11 illustrates a schematic data structure used by the velocity-based scanning subsystem.

FIG. 11 illustrates a schematic data structure 1100 used by the velocity-based scanning module 126. As illustrated in this example, all HotFolders will be listed into a common storage. Against each HotFolder, 'Scanning info' will be maintained. Scanning info may include a scan start time, a scan end time, a next scan scheduled time, a number of candidates file, a number of total files, a first Scan Completion Flag, and/or other data. Each HotFolder may have a local dedicated 'Folder Queue.' The Folder Queue will be used to store subfolders of HF and distribute files to all dedicated 'scanning threads', A fixed number of 'dedicated scanning threads' will be allocated to any HF. The fixed number will be decided by the 'first and periodic scanning manager threads'.

Figure 12:
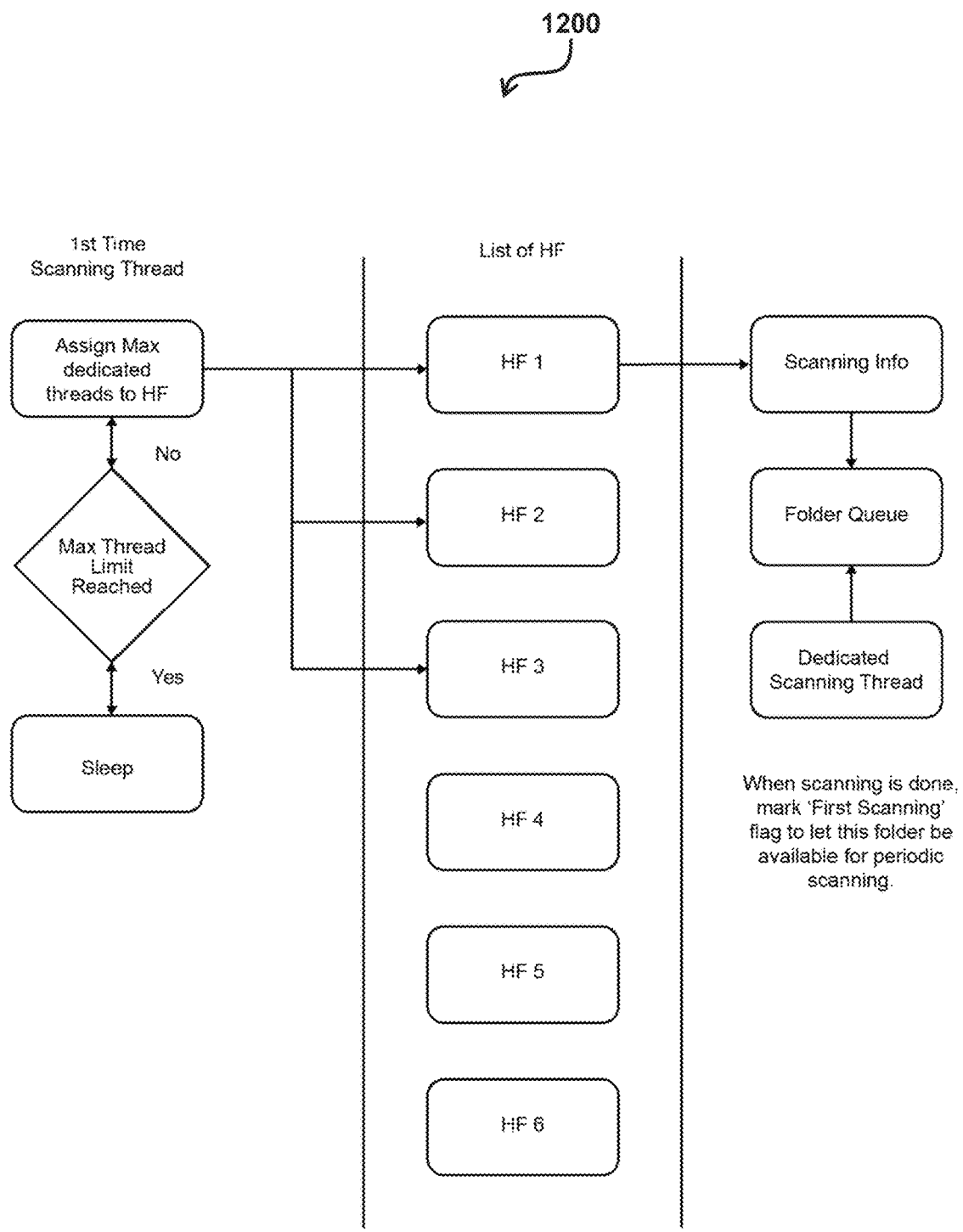
FIG. 12 illustrates a schematic data structure used in a first time scanner manager thread.

FIG. 12 illustrates a schematic data structure 1200 used in a first time scanner manager thread. The purpose of keeping a separate manager thread for first time scanning is to avoid scanning all HF simultaneously when next scan time for HFs are not set. This thread will make sure the scanning threads do not go beyond maximum global set limit. After first scanning all HFs will be aligned to their own scanning cycle. The default global maximum limit of scanning threads (256). The default maximum limit of scanning threads to be allocated to each HF (16). This manager thread will keep assigning maximum dedicated scanning threads (16) to each HF. When the maximum global limit (256) is reached, this thread will stop distributing scanning threads. When scanning of any HF is over, and it's threads are now available for distributions, this manager thread will allot them to further HFs in the list whose 1st scanning is pending. When all the HFs are scanned once, this module will be deactivated.

Figure 13:
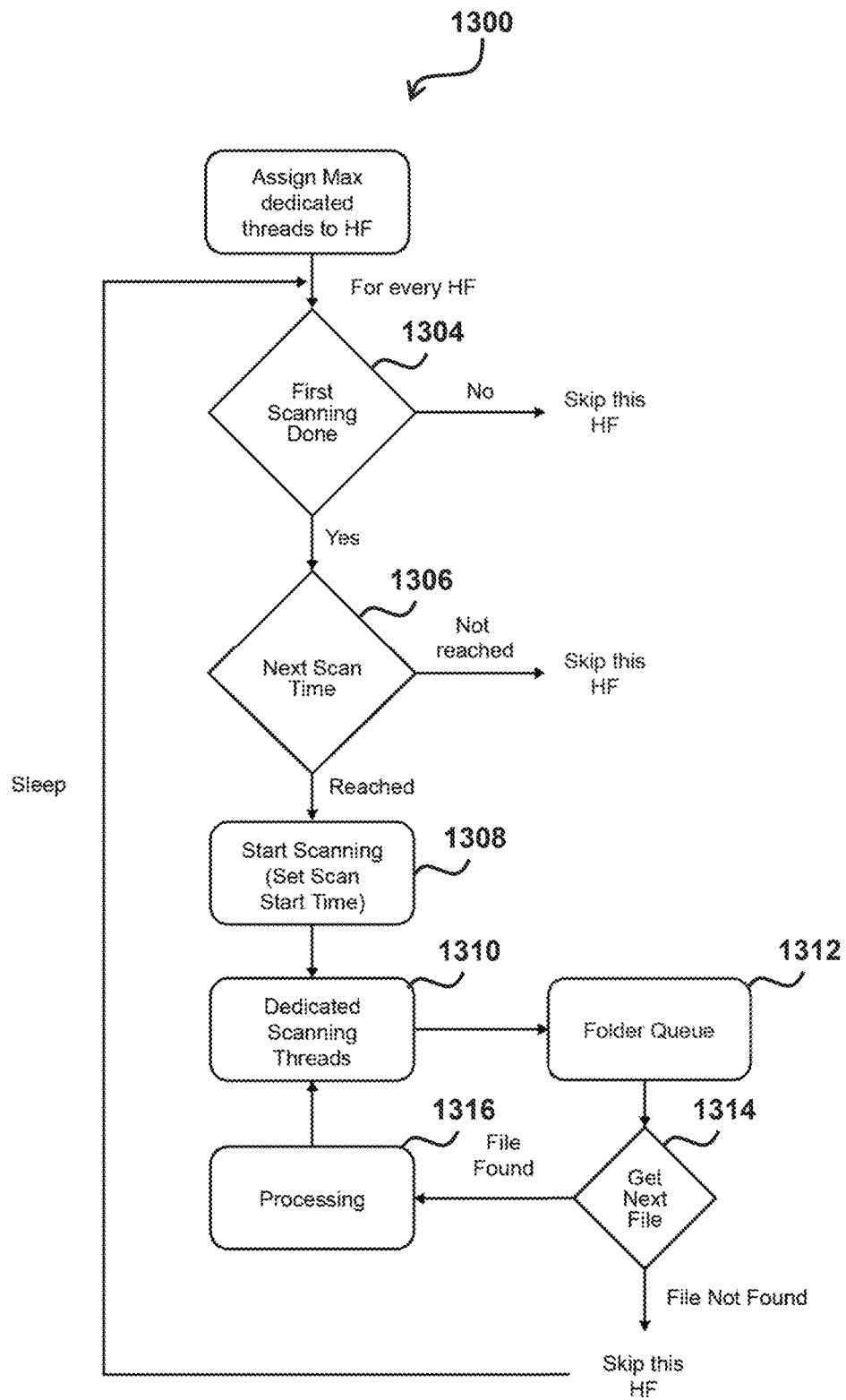
FIG. 13 illustrates a schematic data structure used in a periodic scanner manager thread.

FIG. 13 illustrates a schematic data structure 1300 used in a periodic scanner manager thread. The periodic scanner manager thread will run continuously until the HotFolder service illustrated in FIG. 10 is initiated. At 1302, the periodic scanner manager thread may compute a thread allocation based on the HF count. For example, the periodic scanner manager thread will divide 'scanning threads' between all HFs based on the number of HFs available in the list. The number of threads to be allocated to every HF for periodic scanning is equal to the global limit of threads for periodic scanning/number of HFs. This number may be range bound. It cannot be less than 2 and cannot be more than 16. If the limits are breached, the limits (2 or 16) will be assigned as the value. In every cycle, this thread will check scanning information of all HFs and attempt to start scanning of HFs whose parameters are suitable. Periodic Scanning for every HF will be started based on the following conditions:

At 1304, if a first scan has not been performed, this thread will skip this HF.

At 1306, if 'Next Scan Time' is not yet been reached, this thread will skip this HF.

If the 'Next scan time' has been reached, at 1308, the fix number of scanning threads as decided above will be started to scan this HF. At 1310, dedicated scanning threads may be used for scanning.

Files identified for downstream processing may be added to the folder queue at 1312 and the 'total file count' may be incremented.

If to be processed add it to the File Queue and increment 'candidate file count'.

To reduce impact on CPU when multiple HFs scanning threads are running simultaneously, the Thread Priority of these threads will be set to THREAD_PRIORITY_BELOW_NORMAL. This will ensure other normal priority work is not hampered. The CPU may reach 100% when scanning of HFs is ongoing but below normal priority will ensure they are not impacting work of other processes.

Dedicated Folder Queue

At 1312, the folder queue will manage files and subfolders of any HF at the time of scanning. Any file found at 1314, will be given to the scanning threads for processing at 1316. Any folder found will be added to the Folder Queue at 1312 for further processing only if it is not a valid HF itself. If it is a HF, it is a nested HF scenario. In this case, this folder will be skipped. The reason to skip it is to avoid duplicate scanning since this nested HF will be processed separately by its own dedicated threads. Unavailable HFs or its subfolders will not be processed. They will be attempted to process in every scanning cycle. A separate Folder queue for unavailable folders may not be maintained. During the scan, the count of 'candidate files and total files' are updated continuously and the 'Is Protected' average time is computed for statistical purposes.

When scanning is completed, the Activity Density Percentage for that HF is computed (candidate file count divided by total file count). Based on the Activity Density Percentage, the next scanning time is decided. (Active folders are scanned faster). The 'Next scan time' value is range bound. It cannot be less than 15 minutes and cannot be more than 6 hour. It the limits are breached, then the limits (15 min or 6 hours will be set as the next scan time).

If this was the first scan, the next scan will be started immediately after 15 minutes. (This is an exceptional case. Since the first scan may take a lot of time, the next scan should not wait a proportionate amount of time since the last scan time). The periodic scanner manager thread will also track the 'Activity Density percentage' for every HF and update the scanning slots table, an example of which is illustrated in Table 7.

TABLE 7

Scanning Period Computation. By default there are four scanning slots available based on activity density percentage. The next scan time of any HF will be computed based on one of these.

| File activity percentage brackets | Scanning Wait Time factor |
| --- | --- |
| 0 to 2% | 2x |
| 2 to 8% | x |
| 8 to 14% | 0.5x |
| 14% and greater | 0.05x |

In Table 7, the value of 'x' is a last scanning duration. Every HF will wait proportionate to their last scanning time before they start their next scan. If any HF exhibits high activity, and is in the percentage of 14% or greater, it's wait time will be 0.05 times its last scan duration. A less active folder will be scanned after waiting for a period of time after its last scan duration (such as two times its last scan duration). Activity Density Percentage brackets will be revised continuously based on the latest scans. This revision will only happen when all HFs are scanned once. In every scan cycle, 'minimum and maximum' activity percentage across all HFs are recorded and maintained. Until all HFs are scanned once, this value will be updated continuously. After all HFs are scanned once, if the difference between the min and max percentage value is more than 2%, the percentage brackets will be revised based on the latest percentage range. Otherwise, the old scan sleep values will be followed in the next scanning cycle. For example, if after scanning all HFs, the min and max are 2% and 11%, the new table will adjust according to Table 8.

Table 8 shows an example of adjustments to the values illustrated in Table 7 based on observations from the latest scan.

| File activity percentage brackets | Scanning Wait Time factor |
|---|---|
| 0 to 2% | 2x |
| 2 to 5% | x |
| 5 to 8% | 0.5x |
| 8% and greater | 0.05x |

For example, as illustrated in Tables 7 and 8, the transition of values may be determined based on the following:
Zero to min becomes first range.
Min to Max is divided into three parts.
Min to first part becomes the second range.
First part and second part becomes the third range,
Second part to 100% becomes the fourth range.
If min value is zero, it is replaced with 2.

Figure 14:
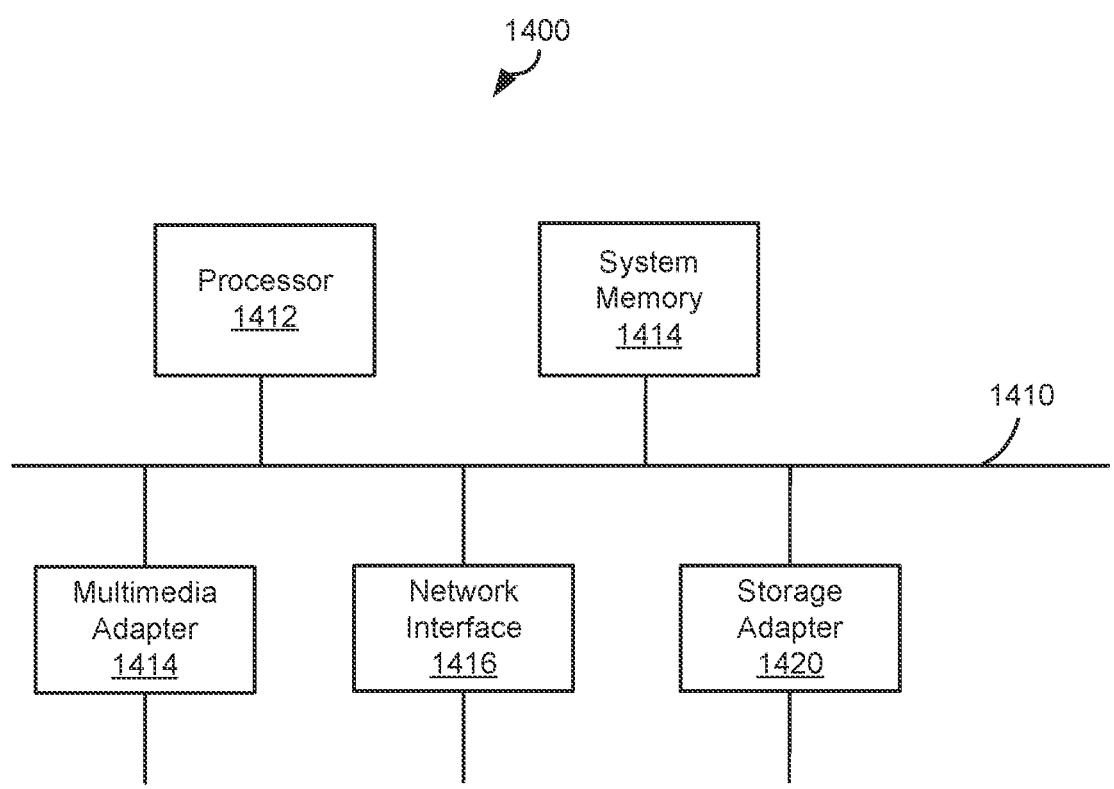
FIG. 14 illustrates an example of a computer system that may be implemented by devices illustrated in FIG. 1.

FIG. 14 illustrates an example of a computer system 1400 that may be implemented by devices illustrated in FIG. 1. The interconnect 1410 may interconnect various subsystems, elements, and/or components of the computer system 1400. As shown, the interconnect 1410 may be an abstraction that may represent any one or more separate physical buses, point-to-point connections, or both, connected by appropriate bridges, adapters, or controllers. In some examples, the interconnect 1410 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 1410 may allow data communication between the processor 1412 and system memory 1418, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 1412 may control operations of the computer system 1400. In some examples, the processor 1412 may do so by executing instructions such as software or firmware stored in system memory 1418 or other data via the storage adapter 1420. In some examples, the processor 1412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1414 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 1416 may provide the computer system 1400 with an ability to communicate with a variety of remote devices over a network. The network interface 1416 may include, for example, an Ethernet adapter, a Fibre Channel adapter, and/or other wired- or wireless-enabled adapter. The network interface 1416 may provide a direct or indirect connection from one network element to another and facilitate communication and between various network elements. The storage adapter 1420 may connect to a standard computer readable medium for storage and/or retrieval of information, such as a fixed disk drive (internal or external).

The term "scanning" a filesystem or similar terms such as a filesystem scan may refer to the act of scanning all or a portion of the filesystem. A portion may refer to one or more distinct files, one or more directories, one or more partitions, and/or other subset of the filesystem 150. The term "module" as used herein may refer to instructions that program hardware and/or hardware that is specifically programmed to perform the functions described with respect to that module.

Other devices, components, elements, or subsystems (not illustrated) may be connected in a similar manner to the interconnect 1410 or via a network. The devices and subsystems can be interconnected in different ways from that shown in FIG. 8. Instructions to implement various examples and implementations described herein may be stored in computer-readable storage media such as one or more of system memory 1418 or other storage. Instructions to implement the present disclosure may also be received via one or more interfaces and stored in memory. The operating system provided on computer system 1400 may be MS-DOS®, MS-WINDOWS®, OS/2®, OS X®, IOS®, ANDROID®, UNIX®, Linux®, or another operating system.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "201A-N" does not refer to a particular number of instances of 201A-N, but rather "two or more."

The databases or datastores described here may be, include, or interface to, for example, an SQLite database, an Oracle™ relational database sold commercially by Oracle Corporation. Other databases, such as Informix™, DB2 or other data storage, including file-based (such as spreadsheet or extensible markup language documents), or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a processor programmed with a file stream scanning module to:
invoke a file scanner to conduct a file scan and detect one or more file events based on the file scan;
identify a highest Update Sequence Number (USN) based on the detected one or more file events, and set a checkpoint USN based on the highest USN;
parse, during a current filesystem check, a sparse file stream comprising a plurality of Update Sequence Numbers (USNs), each USN having a respective byte offset from a beginning of the sparse file stream and identifying a file in the filesystem associated with a file event, wherein each time the file is added or modified, the USN for the file is incremented to indicate that a change has occurred;
access the checkpoint USN, wherein the checkpoint USN is locally stored apart from the sparse file stream and serves as a checkpoint of a prior USN that was identified during a prior filesystem check or during the file scan;
identify a next byte offset for a next USN of a file in the sparse file stream after the checkpoint USN based on the byte offset of the checkpoint USN;
update the checkpoint USN with the next USN;
identify a file event from the sparse file stream based on the next USN without polling files or directories on the filesystem; and
pass the file event to a downstream system.

2. The system of claim 1, wherein to identify the file event, the processor is further programmed to:
decode a bitwise-encoded field that encodes a type of file event from the sparse file stream.

3. The system of claim 1, wherein the processor is further programmed to:
identify a file path of a file corresponding to the next USN; and
pass the file path to the downstream system.

4. The system of claim 3, wherein to identify the file path, the processor is further programmed to:
identify the file path from a Master File Table (MFT) based on the next USN.

5. The system of claim 4, wherein the processor is further programmed to:
generate a file reference map based on a file reference and the file path from the MFT.

6. The system of claim 5, wherein the file reference is a string value, and wherein the processor is further programmed to:
generate the file reference based on conversion of a hexadecimal value of a sequence number to the string value.

7. The system of claim 1, wherein the processor is further programmed with a logfile scanning module to:
access a journaling filesystem log storing a plurality of Log Sequence Numbers ("LSNs"), wherein each LSN is a unique, sequential number that identifies the order in which changes are made to filesystem metadata;
access a checkpoint LSN;
determine a state of the logfile scanning module based on whether or not the checkpoint LSN exists in the journaling filesystem log; and
determine whether to scan the filesystem with a native scanner based on the state of the logfile scanning module.

8. The system of claim 7, wherein the state of the logfile scanning module comprises an inconsistent state, and wherein the processor is further programmed to:
initiate a scan of the filesystem using the native scanner.

9. The system of claim 7, wherein the state of the logfile scanning module comprises a consistent state, and wherein the processor is further programmed to:
parse the journaling filesystem log to identify one or more file events; and
pass the one or more file events to the downstream system.

10. The system of claim 1, wherein the processor is further programmed with a velocity-based scanning module to:
determine a density of activity of at least a portion of the filesystem; and
schedule a scan of the filesystem based on the density of activity.

11. A method, comprising:
invoking, by a processor, a file scanner to conduct a file scan and detect one or more file events based on the file scan;
identifying, by the processor, a highest Update Sequence Number (USN) based on the detected one or more file events, and set a checkpoint USN based on the highest USN;
parsing, by the processor, during a current filesystem check, a sparse file stream comprising a plurality of Update Sequence Numbers (USNs), each USN having a respective byte offset from a beginning of the sparse file stream and identifying a file in the filesystem associated with a file event, wherein each time the file is added or modified, the USN for the file is incremented to indicate that a change has occurred;

accessing, by the processor, the checkpoint USN, wherein the checkpoint USN is locally stored apart from the sparse file stream and serves as a checkpoint of a prior USN that was identified during a prior filesystem check or during the file scan;
identifying, by the processor, a next byte offset for a next USN of a file in the sparse file stream after the checkpoint USN based on the byte offset of the checkpoint USN;
update the checkpoint USN with the next USN;
identifying, by the processor, a file event from the sparse file stream based on the next USN without polling files or directories on the filesystem; and
passing, by the processor, the file event to a downstream system.

12. The method of claim 11, wherein identifying the file event comprises:
decoding a bitwise-encoded field that encodes a type of file event from the sparse file stream.

13. The method of claim 11, further comprising:
identifying a file path of a file corresponding to the next USN; and
passing the file path to the downstream system.

14. The method of claim 13, wherein identifying the file path comprises:
identifying the file path from a Master File Table (MFT) based on the next USN.

15. The method of claim 14, further comprising:
generating a file reference map based on a file reference and the file path from the MFT.

16. The method of claim 15, wherein the file reference is a string value, the method further comprising:
generating the file reference based on conversion of a hexadecimal value of a sequence number to the string value.

17. The method of claim 11, further comprising:
accessing a journaling filesystem log storing a plurality of Log Sequence Numbers ("LSNs"), wherein each LSN is a unique, sequential number that identifies the order in which changes are made to filesystem metadata;
accessing a checkpoint LSN;
determining a state of a logfile scanning module based on whether or not the checkpoint LSN exists in the journaling filesystem log; and
determine whether to scan the filesystem with a native scanner based on the state of the logfile scanning module.

18. The method of claim 17, wherein the state of the logfile scanning module comprises an inconsistent state, the method further comprising:
initiating a scan of the filesystem using the native scanner.

19. The method of claim 17, wherein the state of the logfile scanning module comprises a consistent state, the method further comprising:
parsing the journaling filesystem log to identify one or more file events; and
passing the one or more file events to the downstream system.

20. A non-transitory computer readable medium storing instructions that, when executed by a processor, programs the processor to:
invoke a file scanner to conduct a file scan and detect one or more file events based on the file scan;
identify a highest Log Sequence Number (LSN) based on the detected one or more file events, and set a checkpoint LSN based on the highest LSN;
access a journaling filesystem log storing a plurality of Log Sequence Numbers ("LSNs"), wherein each LSN is a unique, sequential number that identifies the order in which changes are made to filesystem metadata;
access the checkpoint LSN, wherein the checkpoint LSN is locally stored separate from the journaling filesystem log;
determine that the checkpoint LSN exists in the journaling filesystem log;
determine that a logfile scanning module is in a consistent state based on the determination that the checkpoint LSN exists in the journaling filesystem log;
parse the journaling filesystem log to identify one or more file events; and
pass the one or more file events to a downstream system.

21. The non-transitory computer readable medium of claim 20, wherein the instructions, when executed by the processor, further program the processor to:
generate a plurality of hot folders, each hot folder, from among the plurality of hot folders, being associated with a respective portion of a filesystem;
for each hot folder, from among the plurality of hot folders:
determine, independently of other ones of the plurality of hot folders, file system activity for the hot folder; and
determine a frequency of a file scans for the hot folder based on the file system activity.

* * * * *